US012640591B2

(12) United States Patent
    Draak et al.

(10) Patent No.:   US 12,640,591 B2
(45) Date of Patent:        May 26, 2026

(54) WIRELESS POWER TRANSFER

(71) Applicant: KONINKLIJKE PHILIPS N.V., Eindhoven (NL)

(72) Inventors: Johannes Wilhelmus Draak, Horst (NL); Wilhelmus Gerardus Maria Ettes, Leeuwarden (NL); Pascal Leonard Maria Lebens, Eindhoven (NL); Klaas Jakob Lulofs, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 37 days.

(21) Appl. No.: 18/567,381

(22) PCT Filed: May 30, 2022

(86) PCT No.: PCT/EP2022/064509
    § 371 (c)(1),
    (2) Date: Dec. 6, 2023

(87) PCT Pub. No.: WO2022/258403
    PCT Pub. Date: Dec. 15, 2022

(65) Prior Publication Data
    US 2025/0118993 A1      Apr. 10, 2025

(30) Foreign Application Priority Data
    Jun. 8, 2021    (EP) ...................................... 21178185

(51) Int. Cl.
    *H02J 50/12*       (2016.01)
    *H02J 50/80*       (2016.01)
    *H04B 5/79*        (2024.01)

(52) U.S. Cl.
    CPC .............. *H02J 50/12* (2016.02); *H02J 50/80* (2016.02); *H04B 5/79* (2024.01)

(58) Field of Classification Search
    None
    See application file for complete search history.

(56) References Cited

U.S. PATENT DOCUMENTS

2014/0015478 A1    1/2014   Von Novak
2016/0156232 A1*   6/2016   Joye ........................ H02J 50/10
                                                               307/104

(Continued)

FOREIGN PATENT DOCUMENTS

WO        2016195514 A1    12/2016
WO        2021048019 A1     3/2021

OTHER PUBLICATIONS

International Search Report and Written Opinion from PCT/EP2022/064509 mailed Sep. 16, 2022.

*Primary Examiner* — Adi Amrany

(57)               ABSTRACT

A power transmitter (101) provides power to a power receiver (105) via a power transfer signal generated by a drive signal fed to a transmitter coil (103). A first controller (209) of the power transmitter (101) controls a parameter of the drive signal in accordance with a first mode which comprises operating a power control loop to control the power transfer signal in response to power control error messages received from the power receiver (105). A second controller (211) controls the parameter of the drive signal in accordance with a second mode which comprises setting the parameter of the drive signal in response to at least one power transfer signal setpoint received from the power receiver (105). A circuit (213) selects between the first mode of operation and the second mode of operation in response to a power transfer control mode request received from the power receiver (105) and a timing circuit (215) varies a timing parameter for the communication time intervals between the two modes of operation.

23 Claims, 15 Drawing Sheets

(56)    References Cited

U.S. PATENT DOCUMENTS

| | | | |
|---|---|---|---|
| 2018/0062422 A1* | 3/2018 | Kim | H02J 50/12 |
| 2018/0131218 A1* | 5/2018 | Shellhammer | H02J 7/007 |
| 2018/0323647 A1 | 11/2018 | Wageninen et al. | |
| 2018/0323648 A1 | 11/2018 | Joye et al. | |
| 2021/0359545 A1* | 11/2021 | Hall | H04N 23/57 |
| 2024/0213816 A1* | 6/2024 | Lulofs | H02J 50/80 |
| 2024/0380248 A1* | 11/2024 | Lasobras | H02J 50/402 |

* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2022/064509, filed on May 30, 2022, which claims the benefit of EP Patent Application No. EP 21178185.1, filed on Jun. 8, 2021. These applications are hereby incorporated by reference herein.

FIELD OF THE INVENTION

The invention relates to wireless power transfer and in particular, but not exclusively, to wireless power transfer for high power kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

The Wireless Power Consortium is further in the process of developing the Ki Cordless Kitchen standard which builds on the success of the Qi standard to enable higher power applications, specifically for kitchen appliances. The standard expands on Qi to allow power transfers of over 2 kW while allowing save and flexible operation.

Cordless Kitchen appliances are powered by transferring power wirelessly from a power transmitter coil to a power receiver coil. The power transmitter coil is driven by an inverter that can deliver 0-2500 W of power to a resonant circuit including the transmitter coil. Before the inverter is turned on, a communication channel between the power transmitter and power receiver is established. When the communication has been set up and identification of the two devices has been performer, the power transmitter can start power transmission to the power receiver.

A wide range of power transmitter's and power receivers are envisaged to exist. For example, coil sizes, induction values and loads may vary substantially. In addition, placement of the power receiver with respect to the power transmitter may vary resulting in substantial changes in the coupling between the power transfer coils. Accordingly, the system parameters and conditions for the power transfer may vary substantially.

Furthermore, the operating conditions and specifically the power transfer levels may vary substantially. E.g. power receiving devices may have several modes in which they operate. For example, for an airfryer appliance, the heating element can be turned on and off resulting in a load step between 50 to 1200 W, with this happening repeatedly during operation in order to maintain a constant temperature.

Devices may also provide non-linear loads, for example instead of a resistive component a power receiving device may comprise a motor (e.g. a food processor). This results in a completely different response of the system and has a large impact on the control system design.

In order to adapt the operation to varying characteristics and parameters, such wireless power transfer systems typically implement a power control loop to direct the system to the appropriate operating point. In such a power control loop, the power receiver regularly and frequently (in Qi the maximum interval is 250 msec) sends power error messages that instructs the power transmitter to increase or decrease the power level of the generated power transfer signal. The power error messages can be generated by the power receiver based on a comparison of the received power and the desired received power. The power transmitter may then dynamically increase and decrease power in response to the requests thereby allowing the power receiver to control the operation to a desired operating point.

However, although such a power control approach tends to provide advantageous performance in many scenarios, it tends to not be optimal in all circumstances. It tends to be a complex operation requiring a high signaling rate. Further, it tends to provide suboptimal dynamic performance in some scenarios and the dynamic design is often a trade-off between noise performance and transient response.

In particular, many envisaged Ki appliances, such as heating appliances (e.g. kettles) are envisaged as very low cost devices, and in order to achieve such low cost, it is desired for the required functionality to be minimized as far as possible. The conventional power control loop approach however tends to be relatively complex and not only require communication functionality supporting a relatively high data rate but also requires suitable measurement functionality and processing power in order to measure operating conditions and generate suitable power error messages. This increases cost of devices and may hinder the development of very low-cost devices.

Communication between the power transmitter and power receiver in wireless power transfer systems is critical to the efficient operation of the system. In order to support efficient wireless power transfer, wireless power transfer systems, such as Qi and Ki based systems, utilize substantial communication between the power transmitter and the power receiver. Initially, Qi supported only communication from the power receiver to the power transmitter using load modulation of the power transfer signal. However, developments of the standard have introduced bidirectional communication and many functions are supported by communication exchanges between the power receiver and the power transmitter. In many systems, the communication from the power transmitter to the power receiver is accomplished by modulating the power transfer signal. Examples of wireless power transfer systems employing communication between the power receiver and the power transmitter are disclosed in US2018/323647A1, WO2021/048019A1, and US2018/323648A1.

However, as this tends to be less suitable for higher power levels, systems such as Ki use communication functionality that is independent of the power transfer signal and which does not use the power transfer signal as a carrier that is modulated by the data. In particular, the communication between power transmitter and power receiver may be achieved by a short range communication system such as specifically using NFC (Near Field Communication) based communication technology.

Using dedicated communication functionality may in many situations provide improved performance and may e.g. provide faster communication with a higher communication reliability and a reduced impact on the ongoing power transfer.

The power receiver may in many embodiments include NFC communication functionality providing a similar communication function as an NFC contactless smart card which is typically a small device for contactless communication using electromagnetic coupling between a tuned antenna of a reader and a resonance circuit of a receiver. In many situations, the smart card is a passive device powered by the signal induced in the resonance circuit. Similarly, the NFC communication functionality of a power receiver may be powered by the NFC carrier in some situations, such as during start up.

However, although use of dedicated communication functionality such as NFC may provide advantageous performance and operation in many situations, it may not be optimal in all situations.

Wireless power transfer systems may generate electromagnetic interference and in order to achieve electromagnetic compatibility with other devices it is required that this electromagnetic interference is not too excessive. The electromagnetic interference generated by the power transfer signal may not only interfere with other electrical devices but may also interfere with the power transfer devices themselves. In particular, electromagnetic interference caused by the power transfer signal may interfere with the communication functionality, e.g. as provided by NFC communication functionality.

Typically the power transmitter is subject to a strict electromagnetic interference limit an often it is limited by frequency masks indicating permissible electromagnetic interference levels as a function of frequency. However, such electromagnetic interference requirements may be very difficult to achieve and in particular when the power transfer signal is not continuously at the same level, electromagnetic interference may be generated. For example, repeatedly switching off the power transfer signal tends to increase substantial harmonic components that often may not meet the electromagnetic compatibility requirements.

Hence, an improved operation for a power transfer system would be advantageous, in particular, an approach allowing increased flexibility, reduced cost, reduced complexity, improved operation for operations of the power transfer system, improved adaptation, improved dynamic performance, improved adaptability, backwards compatibility, reduced signaling requirements, reduced requirements for power receiver measurements, improved communication performance, reduced electromagnetic interference, improved electromagnetic compatibility, support for reduced cost devices, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: a transmitter coil arranged to generate the power transfer signal; a driver arranged to generate a drive signal for the transmitter coil to generate the power transfer signal, the driver being arranged to generate the drive signal to employ power transfer time intervals during which the power transfer signal is arranged to transfer power to the power receiver and communication time intervals during which a power of the power transfer signal is reduced relative to the power transfer time interval; a receiver for receiving messages from the power receiver during communication time intervals; a first controller arranged to control a parameter of the drive signal in accordance with a first mode of operation, the first mode of operation comprising operating a power control loop to control a power property of the power transfer signal in response to power control error messages received from the power receiver, a maximum duration between power control error messages being no more than 300 msec; a second controller arranged to control the parameter of the drive signal in accordance with a second mode of operation, the second mode of operation comprising setting the parameter of the drive signal in response to at least one power transfer signal setpoint received from the power receiver, the power transfer signal setpoint being indicative of a target power property for the power transfer signal, a maximum duration between power transfer signal setpoints being no less than a second, the second mode of operation comprises not operating any power control loop controlling the drive signal in response to power control error messages received from the power receiver; and a circuit arranged to select between the first mode of operation and the second mode of operation in response to a power transfer control mode request received from the power receiver; and a timing circuit arranged to vary a timing parameter for the communication time intervals dependent on whether the power transmitter is operating in the first mode of operation and the second mode of operation, the timing parameter being a parameter selected from the group consisting of: a duration of the communication time intervals, and a frequency of the communication time intervals.

The invention may provide improved performance in many embodiments, and may provide an overall improved power transfer operation in many systems and embodiments. It may in particular allow a power transmitter to dynamically support both relatively high complexity power receiver devices requiring accurate power provision as well as support low complexity power receiver devices that may not require a tightly controlled or highly accurate power provision. The approach may enable support for very low complexity power receiver devices thereby enabling development and production of lower cost devices. The approach may in particular allow support for very low-cost heating devices, such as kettles, pans or similar kitchen appliances. For example, a low cost heating device can be effectively supported without requiring such a device to include dedicated electrical load signal measurements or complex reporting mechanisms. For example, a heating device may be supported with no measurements at all or e.g. using only a simple temperature measurement to switch the heating on or off depending on the current heating temperature.

In many embodiments, the approach may provide improved support for different types of power receivers and loads. In particular, in many embodiments, the first mode of operation may be highly suitable for providing power to non-linear loads, such as some motors, and the second mode of operation may provide highly advantageous performance for linear loads while achieving low complexity and/or cost.

The invention may provide improved communication in many embodiments and may in particular in many embodiments provide improved communication between a power transmitter and a power receiver using a communication channel not supported by the power transfer signal as a carrier. The invention may provide improved power transfer in many embodiments.

The invention may in many embodiments provide for improved adaptation to different communication requirements/preferences in the different modes. In many embodiments, it may result in reduced electromagnetic interference. For example, for higher power levels the power transmitter may operate in the second mode of operation with the timing circuit adapting the timing parameter to result in lower electromagnetic interference. In many embodiments, the timing circuit may control the timing parameter such that reduced harmonics of repeated communication time intervals may be achieved.

The approach may often provide improved performance by providing an improved trade-off between interference mitigation/prevention and other disadvantageous effects.

In some embodiments, the power transmitter (e.g. specifically the driver) may be arranged to not generate a drive signal and/or a power transfer signal during a communication time interval.

The maximum duration between power transfer signal setpoints being no less than a second may be a maximum possible duration between power transfer signal setpoints being received from the power receiver. A duration between power transfer signal setpoints being received from the power receiver may exceed one second and thus the power receiver may be arranged to transmit power transfer signal setpoints with a duration between power transfer signal setpoints that may exceed one second, and often 2 sec, 5 sec, 10 sec, or 1 minute.

The maximum duration between power control error messages being no more than 300 msec may be a maximum possible duration between power control error messages being received from the power receiver. A duration between power control error message being received from the power receiver may not exceed 300 msec and thus the power receiver may be arranged to transmit power control error messages with a duration between power control error messages that may not exceed one 300 msec.

In many embodiments, the power transmitter is arranged to not receive any power control error messages when in the second mode of operation and/or to ignore received power control error messages. In many embodiments, the power transmitter is arranged to perform power transfer without requiring power control error messages when in the second mode of operation.

The drive signal may employ power transfer time intervals and communication time intervals both when in the first mode of operation and when in the second mode of operation.

In accordance with an optional feature of the invention, the driver is arranged to employ a repeating time frame to the power transfer signal, each repeating time frame comprising at least one power transfer time interval and at least some repeating time frames comprising at least one communication time interval.

This may improve and/or facilitate operation in many embodiments. It may in many embodiments facilitate coordination between the power transmitter and the power receiver communication functions.

In accordance with an optional feature of the invention, the timing circuit is arranged to allocate a larger proportion of a repeating time frame to the at least one communication time interval when in the first mode of operation than when in the second mode of operation.

This may improve and/or facilitate operation in many embodiments. It may in many embodiments provide an improved adaptation to communication requirements and characteristics in the first and second mode of operation while allowing electromagnetic interference to be reduced for the second mode of operation.

In accordance with an optional feature of the invention, the timing circuit is arranged to include a communication time interval in all repeating time frames when in the first mode of operation and to include a communication time interval in only a subset of repeating time frames when in the second mode of operation.

This may improve and/or facilitate operation in many embodiments. In particular, it may allow a low complexity, practical, and/or robust control and adaptation of the communication resources available to the power transmitter and power receiver in the different modes of operation.

In accordance with an optional feature of the invention, the timing circuit is arranged to set a duration of the communication time intervals to be higher when in the first mode of operation than when in the second mode of operation.

This may improve and/or facilitate operation in many embodiments. In particular, it may allow a low complexity, practical, and/or robust control and adaptation of the communication resources available to the power transmitter and power receiver in the different modes of operation.

In accordance with an optional feature of the invention, the timing circuit is arranged to set a duty cycle of the communication time intervals to be higher when in the first mode of operation than when in the second mode of operation.

This may improve and/or facilitate operation in many embodiments. In particular, it may allow a low complexity, practical, and/or robust control and adaptation of the communication resources available to the power transmitter and power receiver in the different modes of operation.

In accordance with an optional feature of the invention, the timing circuit is arranged to set a frequency of the communication time intervals to be higher when in the first mode of operation than when in the second mode of operation.

This may improve and/or facilitate operation in many embodiments. In particular, it may allow a low complexity, practical, and/or robust control and adaptation of the communication resources available to the power transmitter and power receiver in the different modes of operation.

In accordance with an optional feature of the invention, the driver is arranged to be supplied by a varying power supply signal and the power transmitter is arranged to align a center time of the communication time interval with a power minimum for the varying power supply signal.

This may provide improved performance and/or operation in many embodiments, and may specifically reduce the impact of interruptions to the power transfer signal and/or may reduce electromagnetic interference, including in particular electromagnetic interference resulting from or adversely affected by the presence of communication time intervals.

In accordance with an optional feature of the invention, the power transmitter is arranged to terminate power transfer in response to a detection that no power control error messages have been received for a duration exceeding a first threshold when in the first mode of operation and to not terminate power transfer if no power transfer signal setpoint has been received for a duration exceeding a second threshold when in the second mode of operation, the second threshold being at least twice the first threshold.

The first threshold may in many embodiments be no more than 300 msec, 500 msec, 1 sec, 5 sec. The second threshold may in many embodiments be no less than 1 second, 5 sec, 30 sec, 1 min, 10 min.

In accordance with an optional feature of the invention, the power control error messages are indicative of a requested relative change in the power property of the power transfer signal and the setpoint messages are indicative of a requested absolute value of the target power property.

This may provide advantageous operation in many embodiments and may in particular in many embodiments allow for efficient and low complexity operation in both modes of operation.

In some embodiments, durations between power control error messages are no more than 300 msec and a maximum duration between power transfer signal setpoints is no less than 10 sec.

The modes of operation may have substantially different temporal characteristics. A maximum duration between power transfer signal setpoints may be a duration that the power transfer is guaranteed to be maintained without receiving a new power transfer signal setpoint. The power transmitter may be arranged to operate in the second mode of operation without receiving a new power transfer signal setpoint for a duration of no less than 10 sec.

In many embodiments, a maximum duration between power transfer signal setpoints is no less than 30 sec, 1 minute, or even 5 minutes.

In some embodiments, a time constant for the power control loop and a time constant for changing the parameter of the drive signal in response to the at least one power transfer signal setpoint differs by a factor of at least two, five, or even ten.

The modes of operation may have substantially different temporal characteristics. This may provide improved performance in many embodiments.

In some embodiments, the second controller implements a drive signal control loop comprising: an estimator for generating a power level indication for the power transfer signal; a comparator for generating an error signal in response to a comparison between the power level indication and a reference power determined from the at least one power transfer signal setpoint; and an adaptor for adapting the parameter of the drive signal in response to the error signal.

This may provide advantageous operation and/or performance and/or implementation in many embodiments.

In many embodiments, a time constant of the drive signal control loop is no more than half an update rate for the at least one power transfer signal setpoint.

In many embodiments, a duration between receiving power transfer signal setpoints of the at least one power transfer signal setpoint is no less than 5 seconds.

In some embodiments, when in the second mode of operation, the parameter of the drive signal is only changed in response to receiving a power transfer signal setpoint of the at least one power transfer signal setpoint.

This may provide improved performance in many embodiments.

In many embodiments, the parameter of the drive signal is at least one of: a current; a voltage; a phase; a duty cycle; and a frequency.

In some embodiments, the at least one power transfer signal setpoint is indicative of a target power level for the power transfer signal.

This may provide particularly advantageous performance in many embodiments and scenarios. It may often allow a low complexity yet reliable operation.

In many embodiments, the at least one power transfer signal setpoint is indicative of at least one of: a target power level for the power transfer signal; a target current level for the drive signal; a target voltage level for the drive signal; a target phase for the drive signal; a target duty cycle for the power transfer signal; and a target frequency for the power transfer signal.

In accordance with an optional feature of the invention, at least one power transfer signal setpoint is linked to a validity time interval and the second controller is arranged to set the parameter of the drive signal to a nominal value at the end of the validity time interval.

In accordance with an optional feature of the invention, there is provided a wireless power transfer system comprising a power transmitter as described above and the power receiver, the power receiver comprising: a coil for extracting power from the power transfer signal; a power circuit for providing power extracted from the power transfer signal to a load; a transmitter for transmitting the at least one power transfer signal setpoint to the power transmitter during a communication time interval.

In some embodiments, the power receiver is arranged to transmit the at least one power transfer signal setpoint as indicative of a predetermined target power property for the power transfer signal.

In accordance with an optional feature of the invention, the power receiver is arranged to transmit the at least one power transfer signal setpoint as indicative of a target power property for the power transfer signal independently of any measured value for an electrical signal provided to the load.

In some embodiments, the power receiver is arranged to transmit the power transfer signal setpoint in response to a measured value for an electrical signal provided to the load.

In many embodiments, the power receiver is arranged to operate in a plurality of load modes and the power receiver is arranged to transmit a new power transfer signal setpoint to the power transmitter when switching load mode.

In accordance with an optional feature of the invention, the power receiver is arranged to operate in a plurality of load modes and the power receiver is arranged to not transmit a new power transfer signal setpoint to the power transmitter unless switching load mode.

There may be provided a power receiver for wirelessly receiving power from a power receiver via an inductive power transfer signal; the power receiver comprising: a receiver coil arranged to extract power from the power transfer signal; a power circuit coupled to the receiver coil and arranged to provide power from the receiver coil to a load; a transmitter for transmitting messages to the power transmitter, the transmitter being arranged to transmit a power transfer control mode request to the power transmitter, the power transfer control mode request being indicative of a request for the power transmitter to control a parameter of the drive signal in accordance with a first mode of operation or in accordance with a second mode of operation wherein the first mode of operation comprises operating a power control loop to control a power property of the power transfer signal in response to power control error messages received from the power receiver; and the second mode of operation comprises setting the parameter of the drive signal in response to at least one power transfer signal setpoint received from the power receiver, the power transfer signal setpoint being indicative of a target power property for the power transfer signal.

In many embodiments, the transmitter is further arranged to transmit the power transfer signal setpoint to the power transmitter.

In accordance with an aspect of the invention, there is provided a method of operation for a power transmitter wirelessly providing power to a power receiver via an inductive power transfer signal; the power transmitter comprising: a transmitter coil arranged to generate the power transfer signal; and the method comprises: generating a drive signal for the transmitter coil to generate the power transfer signal, the drive signal being generated to employ power transfer time intervals during which the power transfer signal is arranged to transfer power to the power receiver and communication time intervals during which a power of the power transfer signal is reduced relative to the power transfer time interval; receiving messages from the power receiver during communication time intervals; controlling a parameter of the drive signal in accordance with a first mode of operation, the first mode of operation comprising operating a power control loop to control a power property of the power transfer signal in response to power control error messages received from the power receiver, a maximum duration between power control error messages being no more than 300 msec; controlling the parameter of the drive signal in accordance with a second mode of operation, the second mode of operation comprising setting the parameter of the drive signal in response to at least one power transfer signal setpoint received from the power receiver, the power transfer signal setpoint being indicative of a target power property for the power transfer signal, a maximum duration between power transfer signal setpoints being no less than a second, the second mode of operation comprises not operating any power control loop controlling the drive signal in response to power control error messages received from the power receiver; selecting between the first mode of operation and the second mode of operation in response to a power transfer control mode request received from the power receiver; and varying a timing parameter for the communication time intervals dependent on whether the power transmitter is operating in the first mode of operation and the second mode of operation, the timing parameter being a parameter selected from the group consisting of: a duration of the communication time intervals, and a frequency of the communication time intervals.

There may be provided a method of operation for a power receiver wirelessly receiving power from a power receiver via an inductive power transfer signal; the power receiver comprising: a receiver coil arranged to extract power from the power transfer signal; and a power circuit coupled to the receiver coil and arranged to provide power from the receiver coil to a load; a transmitter for transmitting messages to the power transmitter, and the method comprises the transmitter transmitting a power transfer control mode request to the power transmitter, the power transfer control mode request being indicative of a request for the power transmitter to control a parameter of the drive signal in accordance with a first mode of operation or in accordance with a second mode of operation wherein the first mode of operation comprises operating a power control loop to control a power property of the power transfer signal in response to power control error messages received from the power receiver; and the second mode of operation comprises setting the parameter of the drive signal in response to at least one power transfer signal setpoint received from the power receiver, the power transfer signal setpoint being indicative of a target power property for the power transfer signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
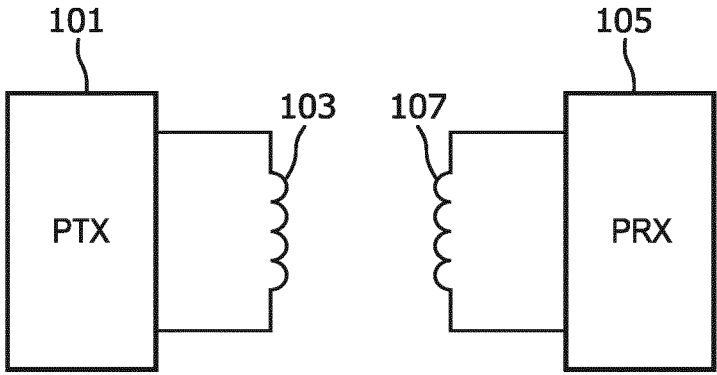
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receive coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 or the Ki Cordless Kitchen specification (except for the herein described (or consequential) modifications and enhancements).

Figure 2:
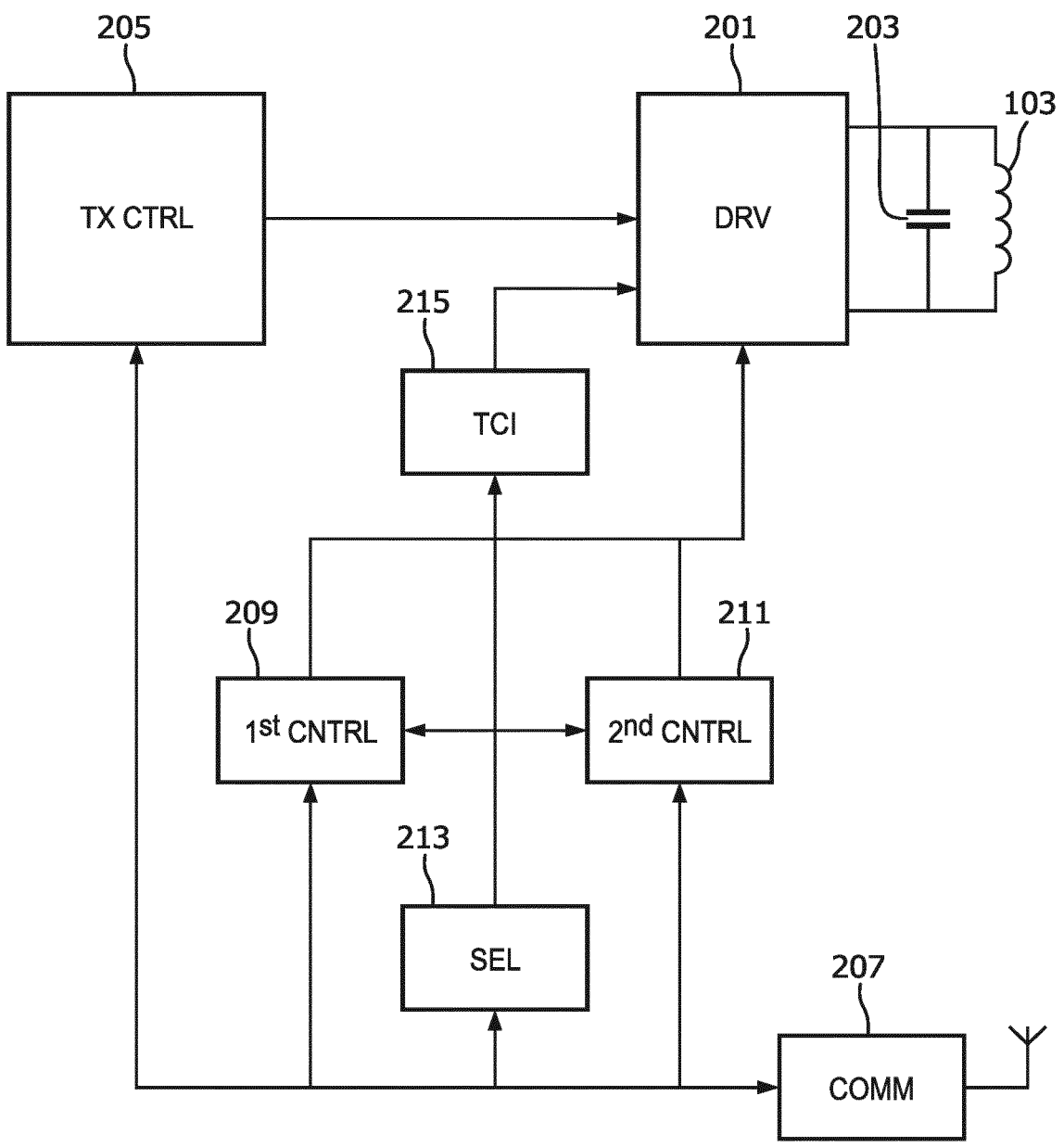
FIG. 2 illustrates an example of elements of a power transmitter in accordance with some embodiments of the invention.

FIG. 2 illustrates an example of a power transmitter in accordance with some embodiments of the invention.

The power transmitter 101 includes a driver 201 which can generate a drive signal that is fed to the transmitter coil 103 which in return generates the electromagnetic power transfer signal providing the power transfer to the power receiver 105. The power transfer signal is provided during the power transfer phase.

In the example, the transmitter coil 103 is part of tank circuit which in the specific example is formed by the transmitter coil 103 and a transmitter capacitor 203 coupled in parallel to form a parallel resonance/tank circuit. It will be appreciated that in many other embodiments, the transmitter coil 103 may be part of a series resonance/tank circuit.

The driver 201 may typically comprise an output circuit in the form of an inverter, typically formed by driving a full or half bridge as will be well known to the skilled person.

The power transmitter 101 further comprises a power transmitter controller 205 which is arranged to control the operation of the power transmitter 101 in accordance with the desired operating principles.

In order to receive data and messages from the power receiver 105, the power transmitter 101 comprises a first communicator 207 which is arranged to receive data and messages from the power receiver 105 (as will be appreciated by the skilled person, a data message may provide one or more bits of information). In some embodiments, the power receiver 105 is arranged to load modulate the power transfer signal generated by the transmitter coil 103, and the first communicator 207 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In many embodiments, the first communicator 207 may also be arranged to transmit data to the power receiver 105, e.g. by modulating the power transfer signal as will be well known to the person skilled in the art.

In the specific described exemplary embodiment, communication is performed using a separate communication channel which may be achieved using a separate communication coil, or indeed using the transmitter coil 103. For example, Near Field Communication (NFC) may be implemented or a high frequency carrier (e.g. with a carrier frequency of 13.56 MHz) may be overlaid on the power transfer signal. In many embodiments, the first communicator 207 may be an NFC or RFID card reader.

It will be appreciated that these are merely examples and that any means or functions for communicating messages/data between the power transmitter and the power receiver (in either direction) may be used.

Figure 3:
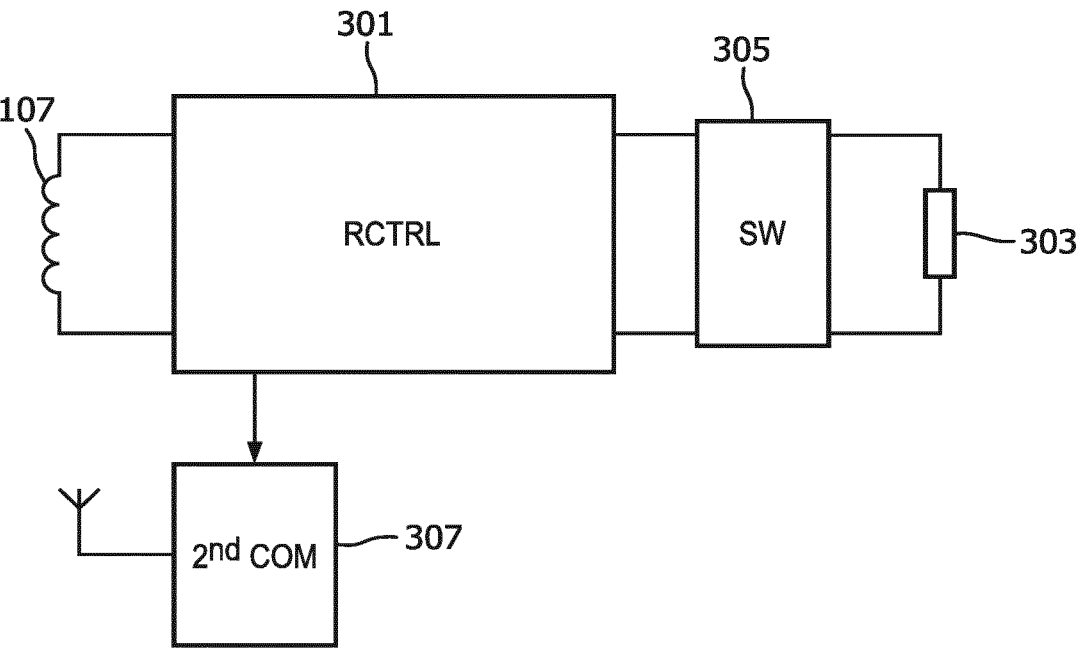
FIG. 3 illustrates an example of elements of a power receiver in accordance with some embodiments of the invention.

FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load 303. In addition, the power receiver controller 301 may include various power receiver controller functionality required to perform power transfer, and in particular functions required to perform power transfer in accordance with the Qi or Ki Specifications.

In many, but not all, embodiments, the receiver coil 107 may be part of a tank/resonance circuit and may be coupled in parallel or series with a capacitor. Thus, in many embodiments, the power transfer may be a resonant power transfer between resonance circuits.

In order to support communication from the power receiver 105 to the power transmitter 101, the power receiver 105 comprises a second communicator 307. The second communicator 307 may specifically be a load modulator arranged to vary the loading of the receiver coil 107 in response to data to be transmitted to the power transmitter 101. The load variations are then detected and demodulated by the power transmitter 101 as will be known to the person skilled in the art. In many embodiments, the second communicator 307 may further be arranged to receive data from the power transmitter 101, for example by demodulating a modulation of the power transfer signal as will be known to the person skilled in the art.

In many embodiments, the second communicator 307 is arranged to communicate without using the power transfer signal and specifically it may be for a separate communication system, e.g. it may be an NFC communication unit.

Specifically, the first communicator 207 and the second communicator 307 may be matching/complementary communication functions arranged to communicate with each other.

The system is arranged to control the drive signal such that the power transfer signal attains suitable operating parameters/properties and the power transfer operates at a suitable operating point. Indeed, the system is arranged to operate in different modes which employ different approaches for controlling the drive signal and power transfer signal. Further, the mode of operation can be selected by the power receiver which can transmit a message to the power transmitter to control this to operate in the selected mode.

The power transmitter 101 comprises a first controller 209 which is coupled to the first communicator 207 and to the driver 201 (as well as possibly other functions such as the transmit controller 205). The first controller 209 is arranged to control a parameter of the drive signal in accordance with a first mode of operation. In this first mode of operation the system and power transmitter operate a power control loop where a power property of the power transfer signal is controlled in response to power control error messages that are received from the power receiver.

At regular, and typically frequent, intervals, the power receiver transmits a power control error message to the power transmitter. As an example, the power receiver 105 may comprise functionality for supporting such a power control loop, including the power receiver controller 301 may example continuously monitoring the power or voltage of a load signal provided to the load and detecting whether this is above or below a desired value. It may at regular intervals generate a power control error message which requests that the power level of the power transfer signal is increased or decreased, and it may transmit this power control error message to the power transmitter (using the communication channel formed by the first and second communicators 209, 307).

When receiving a power control error message from the power receiver, it is forwarded to the first controller 209 which may determine how the drive signal parameter should be modified to increase or decrease the power level of the power transfer signal as requested. If the power transfer is operating in the first mode, the first controller 209 may then control and adapt the drive signal parameter accordingly.

In this first mode of operation, a power control loop is accordingly employed which controls a power property of the power transfer signal to result in the desired operating point at the power receiver.

The power control loop operated in the first mode of operation may in some embodiments be a power control loop in accordance with the requirements and specifications of the Qi or Ki Kitchen Appliance Specifications.

The power transmitter 101 of FIG. 2 is also able to operate in a second mode of operation. The power transmitter 101 comprises a second controller 211 which is coupled to the first communicator 207 and to the driver 201 (as well as possibly other functions such as the transmit controller 205). The second controller 211 is arranged to control the parameter of the drive signal in accordance with a second mode of operation. The second controller 211 is in this second mode of operation arranged to set the parameter of the drive signal in response to a power transfer signal setpoint received from the power receiver where the setpoint is indicative of a target power property for the power transfer signal.

The setpoint may for example indicate a fixed absolute power level of the power transfer signal. Indeed, whereas the power control error messages are typically indicative of requested relative changes, the setpoints are typically indicative of requested absolute values of the target power property for the power transfer signal. The second controller 211 may then control the drive signal in response to this requested fixed absolute power level and may for example set the voltage, current, or frequency such that a power transfer signal with the desired power level to be generated. The second controller 211 may then be arranged to maintain this constant level.

The power receiver 101 may for example be able to only send the setpoint at the start of a power operation and the power transmitter may then proceed to maintain this constant power level throughout the power transfer. Thus, in this case, no power control is performed in the second mode of operation but rather a fixed power level that has been requested by the power receiver is maintained.

Such an approach may be highly suitable for some power receiver devices and appliances. In particular, it may allow low complexity devices to be implemented without requiring power control loop feedback to be implemented. For example, for a kettle, it is typically merely required that an approximate power is induced in a heating element without any need for this to be an accurate or dynamically adapted specific power level.

In the second mode of operation, power control loop may thus be inoperative and no adaptation of the drive signal is performed in response to power control loop error messages being received from the power receiver. In the second mode of operation, the power transmitter may be arranged to employ no power control loop that includes the power receiver. In the second mode of operation, the power control loop employed in the first mode of operation may be deactivated and may not affect the drive signal.

The power levels that can be provided in the two modes of operation may in many embodiments be the same, or indeed it may be possible to provide even more power in the second mode of operation than in the first mode of operation. In many embodiments, a maximum (allowable) power level for the second mode of operation is at least as high as a maximum (allowable) power level for the first mode of operation. The maximum power level may be restricted by many things, such as the supply power, the component characteristics, safety limits etc, and these factors may be independent of the mode of operation and the mode of operation may not change the maximum power level that is allowed to be provided/extracted by the power receiver.

Different parameters of the drive signal may be adapted (by the first controller 209 and the second controller 211) in different embodiments and the setpoints may be indicative of different properties of the power transfer signal. The following description will focus on examples where the setpoint is indicative of a requested or desired power level of the power transfer signal and the drive signal parameter adjusted is the real power of the drive signal. In most cases, the power losses in e.g. the resonance circuit and the transmitter coil 103 are relatively low and the power level of the power transfer signal may be considered/assumed to be the same as the power level of the drive signal. In other cases, the system may include considerations of a difference between the drive signal parameter and the power transfer signal property when determining the drive signal parameter value. For example, the second controller 211 may take into account that a loss occurs in the output circuit and compensate by setting the power level of the drive signal to be higher than requested by the setpoint, e.g. it may be set to be 10% higher or a dedicated function (e.g. implemented as a Look-Up-Table populated by a calibration process) may be used to convert the setpoint value to a suitable target value for the drive signal parameter/power level.

The power transmitter further comprises a selection circuit 213 which is arranged to switch the power transmitter between the first and second modes of operation. In the example, the selection circuit 213 is arranged to select between the first and second mode by controlling either the first controller 209 or the second controller 211 to be active and to provide a control signal to the driver for adapting the parameter of the drive signal. In other embodiments, other approaches may be uses such as e.g. selecting between the outputs of the two controllers 209, 211 and coupling only the appropriate output to the driver 201, controlling the driver 201 to only react to signals from the appropriate controller etc.

The selection circuit 213 is coupled to the first communicator 207. The power receiver is arranged to transmit a power transfer control mode request to the power transmitter where the power transfer control mode request is indicative of a requested mode of operation by the power transmitter. In the specific example, the power transfer control mode request may indicate a request for the power transmitter to operate in the first mode of operation or in the second mode of operation (it will be appreciated that in other embodiments more than two modes of operation may be possible).

The selection circuit 213 is arranged to select the mode of operation indicated by the power transfer control mode request and specifically the selection of the first or second mode of operation to be used with the power transfer to the power receiver is performed in accordance with the power transfer control mode request. Thus, in the approach, the power receiver transmits a power transfer control mode request that controls the power transfer signal control operation of the power transmitter.

The approach may allow a power transmitter to operate with a range of different power receivers including more complex power receivers and power transfer operations that require an accurately controlled power supply and which can support a full power control loop. It may further also support simple power receivers that merely require an approximate power transfer and which are not sensitive to power variations. This may for example allow very low cost power receivers to be supported without sacrificing potential performance that may be provided to high end and more demanding power receivers. The approach may provide improved performance that can be adapted effectively and with low complexity to the specific requirements and preferences of the individual power transfer operation and power receiver.

An advantage of the approach is further that it may allow power transfer to be adapted to different loads. For example, the first mode of operation may be highly suitable for both linear and non-linear loads, such as motors, whereas the second mode of operation may be mostly suitable for loads that are linear or substantially linear. Thus, the second mode of operation may be selected and used for linear, e.g. resistive, loads with a low complexity operation. However, even if a non-linear load is not critical in terms of required power provision accuracy, it may still be advantageous to select the first mode of operation as this will provide improved compensation for the non-linearity.

Figure 4:
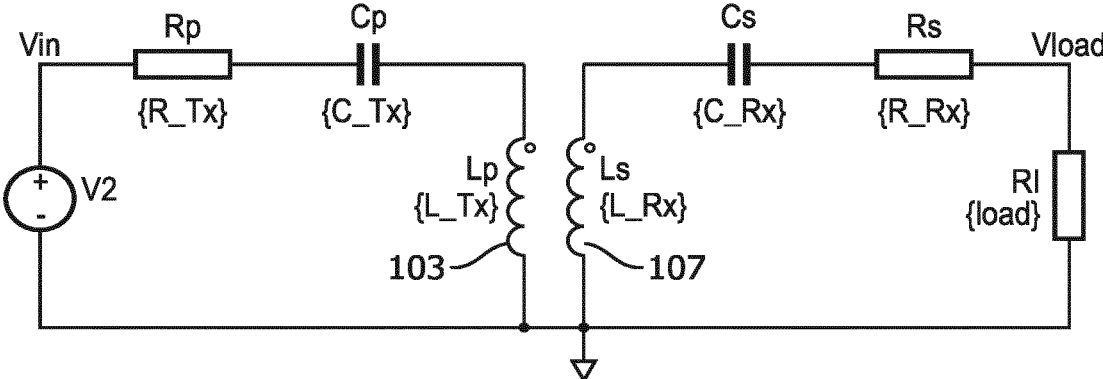
FIG. 4 illustrates an example of elements of a power transfer path in accordance with some embodiments of the invention.

As a specific example to illustrate the approach, a cordless kitchen appliance can be powered by transferring power wirelessly from a transmitter coil 103 to a power receiver with the transmitter coil 103 being driven by a driver/inverter that can deliver 0-2500 W of power to the resonant circuit comprising the transmitter coil 103. Before the inverter is turned on, a communication channel between the power transmitter and power receiver is established. When the communication has been set up and identification of the two devices has been executed, the power transmitter can start power transmission to the power receiver. An equivalence circuit for the power transfer operation is shown in FIG. 4.

A wide range of power transmitters and power receivers can exist. For example, the coil sizes, induction values and loads may vary substantially. Accordingly, the system parameters, such as those represented by the equivalence components in FIG. 4, vary with specific devices and mechanical constructions. In addition, the placement of the power receiver will change the coupling between the coils (Lp and Ls) resulting in changes to the system behavior.

Furthermore, the devices can have several modes in which they operate, for example: several loads can be switched on or off. For example, a heating element may be turned on and off resulting in load steps between, say, 50 W and 1200 W.

Conventional systems tend to use a power control loop to ensure that the right operating point is reached. This control loop changes the amount of power that is transmitted to the power receiver. The received power (or voltage or current) can be measured by the power receiver and compared to a reference value to generate an error indication. The power receiver can send this error indication to the control system in the power transmitter which can adapt the drive signal to minimize the static error. The error indication is transmitted as a power control error message. Such a control loop will have a certain response time and internal delays and low pass filtering prevent a loop from immediately reaching the correct operating point.

The power transmitter described with reference to FIG. 2 may be arranged to operate with a conventional power receiver using such a power control loop when in the first mode of operation.

However, depending on the appliance and application, the speed of reaching the correct operating point may be of high importance. Furthermore, for some appliances it is not very important that a specific accurate power level is reached, and it may be sufficient that the provided power level is in a suitable range which may in some cases vary substantially.

For such power receivers and applications, the control of the power transfer signal power may be based on the power receiver transmitting a power transfer signal setpoint indicative of a target power property for the power transfer signal, and the power transmitter then simply controls the drive signal to provide this power property without implementing the normal full power control loop that is implemented in the first mode of operation. Thus, for such appliances and applications, the power transmitter may instead operate in the second mode of operation.

The power receiver may transmit the power transfer control mode request to the power transmitter before power transfer, the preferred control can be selected. For example, if the appliance requires a fast control loop, the received power may be measured in the appliance and the appropriate power control error messages may be sent to the power transmitter. If only infrequent power changes and approximate power provision is required, the power transfer control can instead be based on the power receiver transmitting a setpoint to the power transmitter.

The approach may provide the opportunity for reducing cost of the appliance since expensive power measurement and control means are not needed. This enables that very simple appliances can be produced without including any internal measurement circuits.

In some embodiments, the operation when in the second mode of operation may be a substantially static operation. Specifically, the second controller 211 may be arranged to only change the drive signal parameter when a power transfer signal setpoint is received from the power receiver. Thus, the power transmitter may receive a setpoint and may then fixedly set the drive signal parameter to provide an operating point in accordance with this setpoint until a new setpoint is received.

In this example, the setpoint may specifically be indicative of a predetermined target power property for the power transfer signal. For example, a power receiver may be designed for a given power level. E.g., a heating element of a kettle may be designed for an induced power of, say, 2 kW. Such a power receiver may be arranged to transmit a setpoint corresponding to the predetermined power level and may not include any measurements or other considerations of current conditions etc. Rather, a low complexity approach may be implemented where, whenever such a power receiver initiates a power transfer, it transmits a setpoint that requests the power transmitter to control the operation to provide the requested power, i.e. in the specific example, whenever the kettle is initiating a power transfer, it sends a setpoint requesting that a fixed power of 2 kW is provided continuously and constantly. The power transmitter then proceeds to set the drive signal parameter to provide a power transfer signal with such a power level, typically by controlling the drive signal parameter to result in a drive signal power level of 2 kW (or slightly higher).

In many static embodiments, the power receiver may transmit a setpoint which is indicative of a target power property that is independent of any measured values for an electrical signal provided to the load. Thus, the power receiver may generate the setpoint without any consideration or measurement of the electrical load signal, and indeed may in many embodiments be completely independent of any current conditions or measurements. In such embodiments, the power receiver controller 301 may store one (or more) suitable setpoints which may be retrieved and transmitted to the power transmitter during power transfer initialization.

Figure 5:
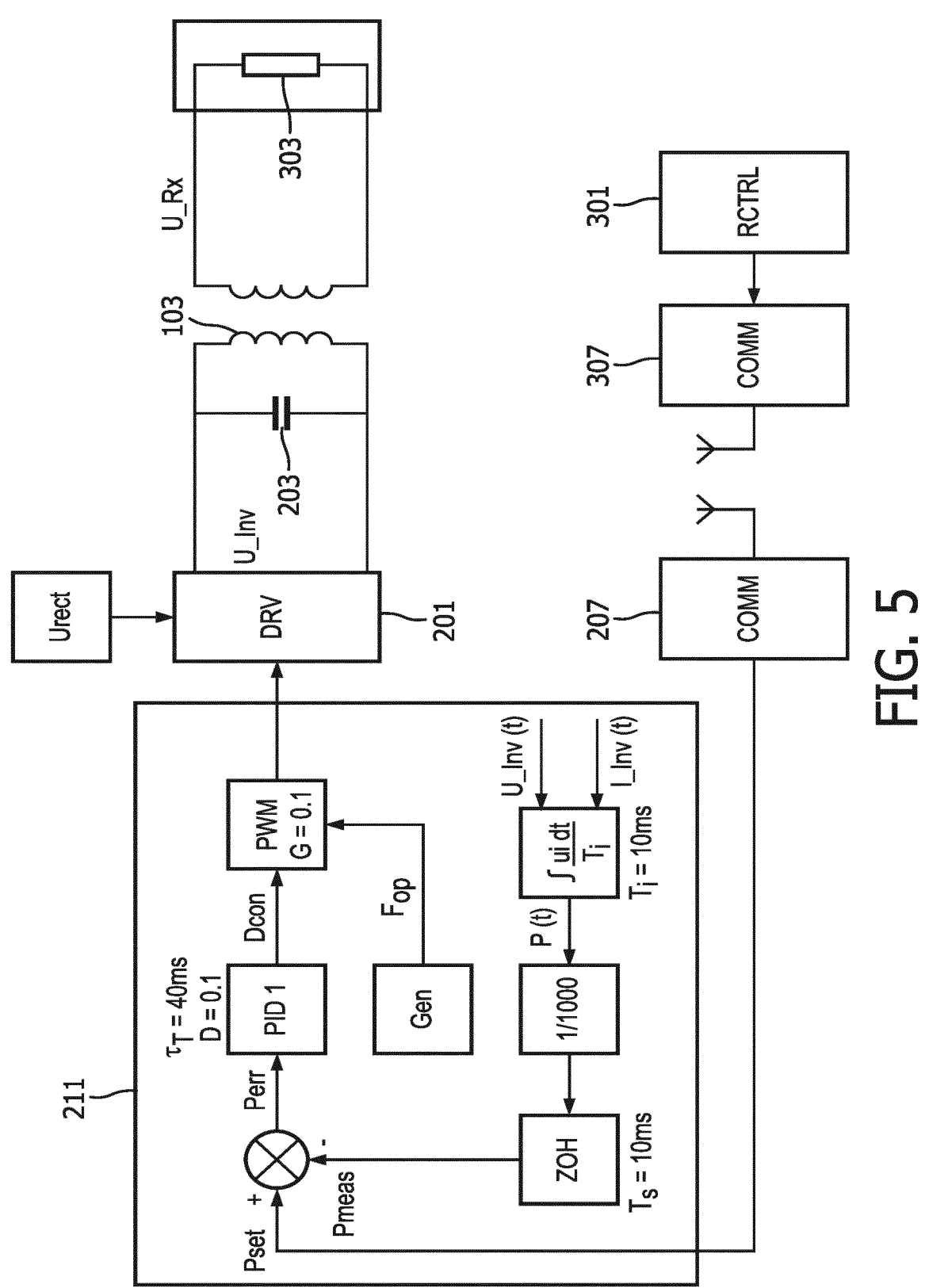
FIG. 5 illustrates an example of elements of a power transfer path in accordance with some embodiments of the invention.

FIG. 5 illustrates an example of the power transfer and control paths that may exist in such an embodiment. Such an approach may as mentioned be highly suitable for a low complexity kettle which may simply transmit a setpoint with a predetermined power request as part of the power transfer setup, with the power transmitter then pursuing this power level for the entire operation. In many embodiments, the setpoint may simply request that the maximum possible power level is provided.

In this example, the power receiving appliance itself does not contain any measurement electronics, and just transmits the power setpoint signal. This may make the appliance cheaper than one containing measurement circuits. There may be a small steady state error in the actual power that the appliance receives, but for heating appliances this is typically not problematic. The influence of changing system parameters (e.g. due to the power receiver being moved) could be unnoticed with such an approach.

In some embodiments, the power receiver may be arranged to operate in a plurality of load modes. Each load mode may be associated with a different set of parameters for the load signal being provided to the load. For example, each load mode may be associated with a different power being provided to the load, with a different combination of voltage and current being provided to the load, etc. For example, a kettle may be arranged to operate in a high power mode, a low power mode, or may be switched off.

Each of these modes may be associated with a different setpoint, such as with a different target/required/requested power for the power transfer signal. In such an embodiment, whenever the power receiver switches to a new load mode, it may transmit a new setpoint. For example, the power receiver controller 301 may store the appropriate setpoint for each load mode and when it switches to a new load mode, the setpoint for this may be retrieved and transmitted to the power transmitter. The power transmitter may then adapt to the new setpoint. Indeed, in many embodiments, the change in the load signal provided to the load is indeed achieved via the transmission of the new setpoint and the adaptation by the power transmitter.

In many embodiments, the power receiver may be arranged to not transmit a new power transfer signal setpoint to the power transmitter unless switching load mode. For example, whenever the power receiver switches to a new load mode, the power receiver transmits a new setpoint but no additional setpoints are transmitted when the system is operating in the same load mode.

The system may thus provide a simple and static operation and power transfer signal control, yet still allow for different load modes to be supported with different characteristics.

In some embodiments, the power receiver may not perform any measurements of electrical parameters of the load signal fed to the load but may adapt the operation in response to measurements of other modalities, such as movement, vibration, or temperature.

Figure 6:
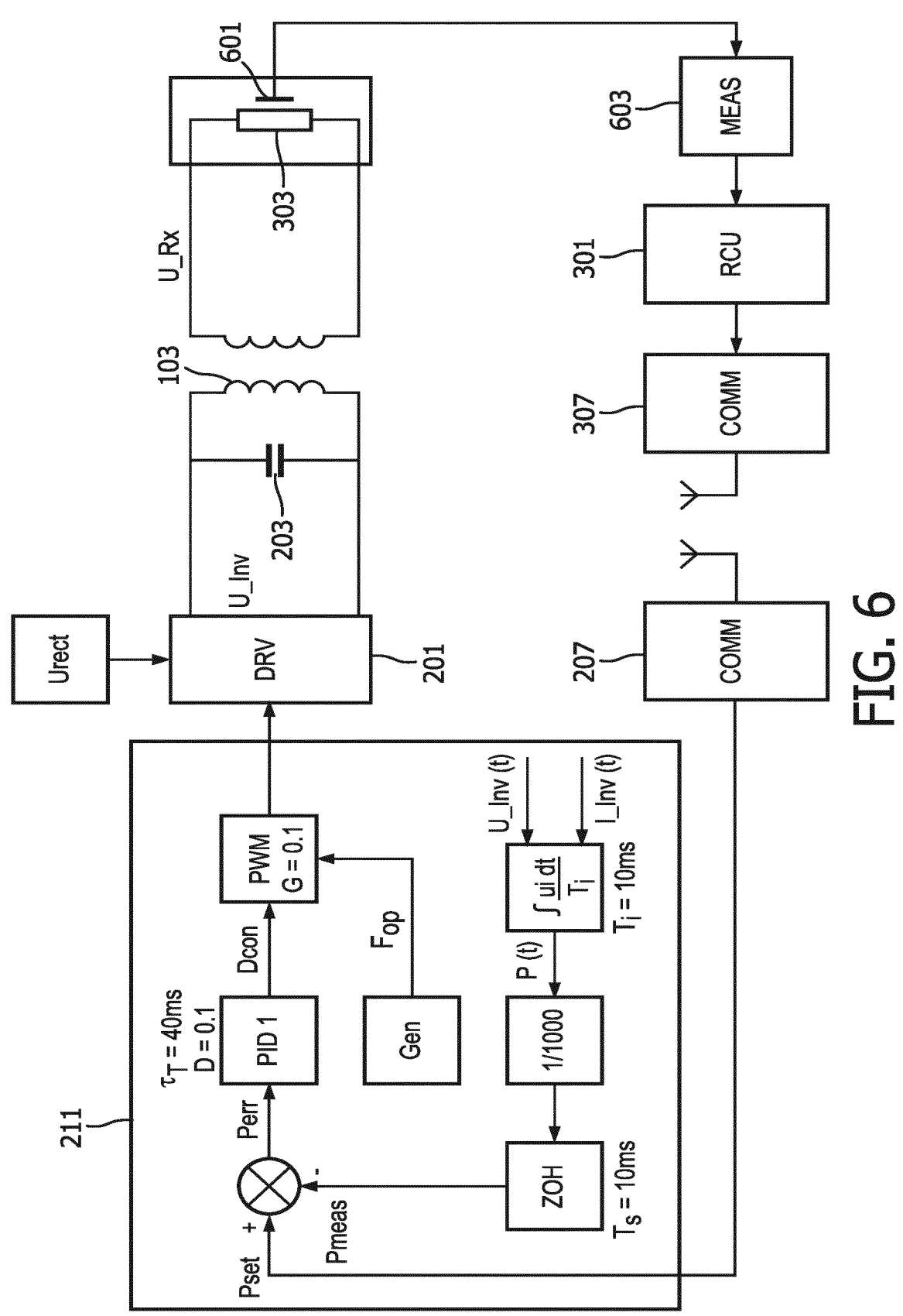
FIG. 6 illustrates an example of elements of a power transfer path in accordance with some embodiments of the invention.

For example, as illustrated in FIG. 6, the kettle of FIG. 5 may in some embodiments comprise a thermometer 601 which measures the temperature of the liquid in the kettle. The thermometer 601 is coupled to a measurement circuit 603 which converts the measurement signal into a suitable data representation that is fed to the power receiver controller 301.

In such a case, the power receiver controller 301 may be arranged to determine that a new setpoint should be transmitted in response to the measurement of a non-electrical property meeting a criterion. For example, if movement is detected, the power receiver controller 301 may transmit a setpoint that switches the power transfer signal to a lower power level such that there is reduced risk of unintentional induction in other elements.

The approach may also be combined with a power receiver operating in different load modes. For example, if the measurement meets the criterion, the power receiver may switch to a different load mode and a new setpoint may be transmitted. As a specific example, a kettle may include a thermometer which measures the temperature of the liquid being heated. When a new power transfer operation is initiated, the power receiver may switch to a maximum load mode and a setpoint indication requesting maximum power may be transmitted to the power transmitter resulting in a maximum power level power transfer (e.g. 2 kW). If the thermometer indicates that the boiling point has been reached, the power receiver may switch to a low power mode, e.g. with a 50 W power level. If the temperature now falls below a given level, e.g. 90° C., the power receiver may switch back to full power and a setpoint requesting maximum power may be transmitted to the power transmitter. In this way, the liquid may achieve a heating to a desired temperature yet allow very low complexity operation.

The described approach may be used to support in particular heating appliances with very simple control means. For example, it is desirable that a Ki heating device (e.g. a kettle) can be produced as a low cost appliance to compete with other heating devices (such as e.g. cheap corded kettles). In order to maintain a very low cost, it is important to minimize the requirements and functionality that must be included. The current approach may result in very low complexity control mechanisms that do not require much functionality and specifically reduces measurement and reporting requirements. The latter may be very significant as it may e.g. allow a power receiver to be manufactured using e.g. only NFC communication rather than more expensive Bluetooth communication. Further, this support can be provided without sacrificing support for more complex and expensive devices requiring accurate power control.

The current approach allows for such a low cost heating appliance to simply advertise a simple static power request to the power transmitter, with the power transmitter then processing this to generate a power transfer signal with suitable properties. This is achieved by the power transmitter setting the drive signal parameter appropriately, e.g. using a fast internal drive signal control loop.

In such a case, the power receiver/heating appliance may simply receive the power and perform no other control operation. However, in many embodiments, it may include a low cost temperature measurement that measures the temperature and simply checks whether this has reached a given temperature or not. When the temperature reaches this level, it may e.g. transmit a new setpoint which e.g. may correspond to a power off command (the new setpoint is zero output) or e.g. may correspond to a low power value.

Indeed, in many embodiments, the power levels may be fixed (or e.g. communicated once during device initialization) and the setpoint may be communicated as a simple binary value. For example, a setpoint indication of 1 may result in a power transfer signal with a power level of, say, 2000 W and a setpoint indication of 0 may result in a power transfer signal with a power level of, say, 50 W (or e.g. 0 W).

In some embodiments, a more dynamic approach may be taken where the power receiver is arranged to transmit the power transfer signal setpoint in response to a measured value for an electrical signal provided to the load. The power receiver controller 301 may specifically determine a suitable value for the target power property for the power transfer signal in response to the measured value for the electrical load signal. Thus, in some embodiments, the power receiver controller 301 may be arranged to transmit a new setpoint indication when it is detected that the measured value(s) meet(s) a criterion. Alternatively, or additionally, the setpoint, e.g. the requested power level, may be determined based on the measured value.

Figure 7:
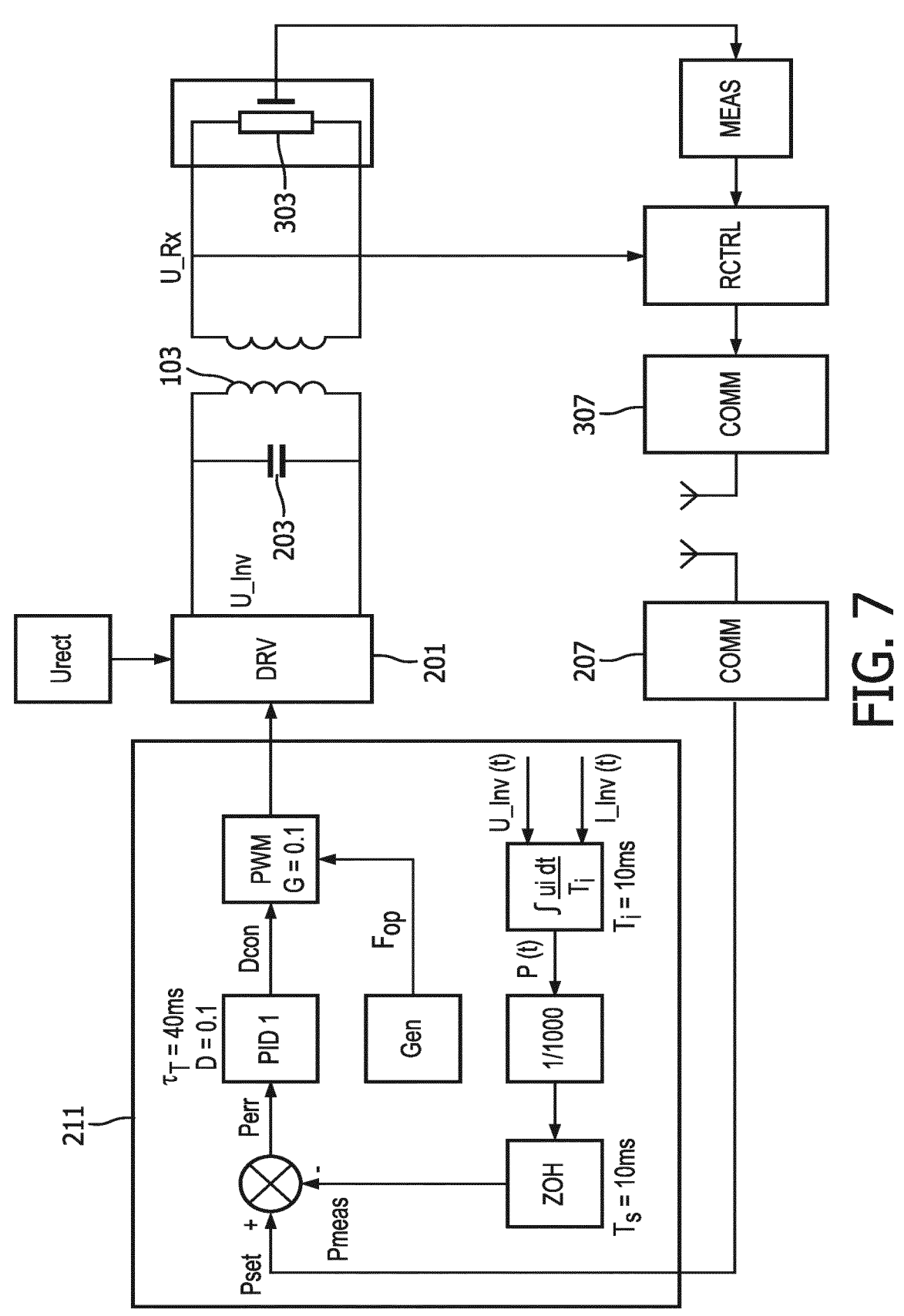
FIG. 7 illustrates an example of elements of a power transfer path in accordance with some embodiments of the invention.

An example of such an approach where the voltage of the signal provided to the load is measured and used to control the setpoint transmission is shown in FIG. 7.

In the example, the power receiver controller 301 measures the load voltage (e.g. motor voltage) U_Rx and evaluates whether this meets a criterion. Specifically, in many embodiments, the power receiver controller 301 may compare the load signal voltage U_Rx to a desired reference level U_Rx_set. If the difference exceeds a given level, the power receiver controller 301 may proceed to generate and transmit a new setpoint indication. For example, if the measured voltage is too low, a higher power level of the power transfer signal may be requested and if it is too high, a lower power level of the power transfer signal may be requested.

In many embodiments, the second controller 211 may be arranged to control the drive parameter by implementing a control loop in the power transmitter that uses the received setpoint as a reference or target value, i.e. a target value for a property of the loop is determined based on the setpoint, and the loop is then operated such that an error signal between this and a current loop parameter is minimized.

FIGS. 5-7 illustrate an example where the second controller 211 implements such an internal power transmitter drive signal control loop.

In the examples, the drive signal control loop is based on power measurements. A target power level for the control loop is determined in response to the received setpoint indication and the power property for the power transfer signal. In many embodiments, the power reference Pset may simply be set to the requested power level for the power transfer signal. An estimator determines a power level indication Pmeas for the power transfer signal. In the examples of FIGS. 5-7, this is based on a power estimate for the drive signal and specifically by measuring the current and voltage of the drive signal generated by the driver 201 and determining an averaged/low pass filtered power estimate from a multiplication of these measurements.

A comparator may then compare the estimated drive signal power Pmeas and the power reference Pset to generate an error signal Perr representing a power level error indication indicative of the difference between these. The error signal Perr is filtered by a low pass filter PID 1 which includes at least one integration. The resulting signal Dcon is an error signal fed to an adapter arranged to change the power level of the drive signal, in the example by changing the duty cycle of the drive signal using a pulse with modulation (PWM) of the output of the driver 201.

In some embodiments, the second mode of operation may accordingly include the power transmitter implementing a local feedback control loop to control the drive signal and thus the power transfer signal. This may provide an accurate and fast adaptation to the specific setpoint yet may allow low complexity and low cost power receiver devices.

In such embodiments, the adaptation performance and operation of the internal power transmitter drive signal control loop is typically much faster than any changes or variations that may result from setpoint updates. In many embodiments, the time constant of the drive signal control loop is no more than half, and often $\frac{1}{4}$, $\frac{1}{10}$, or $\frac{1}{100}$ of an update rate for the setpoints. In many applications, the time it takes for the drive signal control loop to adapt to a new setpoint can be considered to be substantially instantaneous in comparison to the timings of the operations associated with a new setpoint.

The described approach may thus enable a single power transmitter to operate in different power transfer signal control modes under the control of the power receiver.

The power control loop of the first mode of operation is typically very fast in adapting to variations whereas the setpoint approach of the second mode of operation tends to be much slower. Indeed, typically, the two approaches are used with respectively power receivers that require accurate and fast power control and power receivers that are not sensitive to power variations or inaccuracies and where the only changes are slow and infrequent (such as e.g. when changing load mode).

Indeed, in most applications, durations between power control error messages are no more than 300 msec (e.g. for Qi or Ki compatible systems, a power control error message must be transmitted at least every 250 msec) and a maximum duration between power transfer signal setpoints is no less than 10 sec, or even 50 sec or 100 sec. Indeed, in many embodiments, there is no need for any update of the setpoint and the maximum duration between setpoints may be infinite in principle.

In contrast, the maximum duration between power transfer signal setpoints is no less than 1 second and the power transmitter is arranged to operate in the second mode of operation for no less than one second without receiving any power transfer signal setpoints. The power transmitter when operating in the second mode of operation is arranged to continue power transfer for a duration of no less than one second, and typically of no less than 5 sec, 10 sec, 60 sec, and indeed often indefinitely. Thus, when in the second mode of operation, power transfer is continued based on a last received power transfer signal setpoint even if no further power transfer signal setpoint is received for an interval of no less than 5 sec, 10 sec, 60 sec, and indeed often indefinitely.

In many embodiments, the power transmitter may when operating in the first mode of operation be arranged to terminate power transfer if it is detected that no power control error messages have been received for a duration longer than a first threshold. This first threshold may specifically be 250-300 msec in many applications where a power control error message is required to be transmitted at least every 250 msec (such as in Qi or Ki systems). In some embodiments, the threshold may be selected higher to allow for potentially some failed transmissions. In many embodiments, the first threshold may be no less than 250 msec, 300 msec, 500 msec, 1 sec.

In contrast, when in the second mode of operation the power transmitter is arranged to not terminate power transfer even if no power transfer signal setpoint has been received for a duration longer than a second threshold which is at least twice the first threshold, and often at least 10 or a 100 times the first threshold. In many embodiments, the power transmitter is arranged to not terminate power transfer even if no power transfer signal setpoint is ever received after the first power transfer signal setpoints, i.e. if only one power transfer signal setpoint is received. Thus, in many embodiments, no repeated transmission and receipt of power transfer signal setpoints is required when in the second mode of operation. Rather, in many embodiments, only an initial power transfer signal setpoint is required with the power transmitter maintaining the corresponding power level until a new power transfer signal setpoint is received, or possibly if no further power transfer signal setpoints are received until the power transfer operation is finished or the systems switches to the first mode of operation.

In many embodiments, no power control error messages are received when in the second mode of operation. In many embodiments the power transmitter may be arranged to continue a power transfer operation when in the second mode of operation even if no data is received from the power transmitter requesting a change of power level. In many embodiments, the second threshold may be no less than 1 sec, 10 sec, 60 sec, 10 min.

In many embodiments, a time constant for the power control loop and a time constant for changing the drive signal parameter in response to a new setpoint differs by a factor of at least two, and often by a factor of at least 5, 10, 20, or 100. In most embodiments, the power control loop will be fast reacting whereas the setpoint approach is substantially static.

Indeed, in many embodiments, the interval between receiving setpoints being transmitted is no less than 5 seconds, 10 seconds, or even 60 seconds.

It will be appreciated that different parameters of the drive signal can be controlled in different embodiments. For example, as described above the first controller 209 and the second controller 211 may directly control the power level of the drive signal, e.g. using the drive signal control loop as previously described.

In some embodiments, the adaptation may be performed by adapting either the current and/or the voltage of the drive signal. For example, a fixed supply voltage may be provided to the driver 201 and the drive signal may have a corresponding fixed voltage amplitude. In such embodiments, the adaptation may be by adapting the current of the drive signal.

In some embodiments, the adaptation of the power transfer signal power may be by adapting a duty cycle of the drive signal. For example, typically, increasing the duty cycle will increase the average power level whereas decreasing the duty cycle will reduce it.

In some embodiments, the adaptation may be achieved by adapting the frequency of the drive signal. For example, for a resonant output circuit, changing the frequency to be closer to the resonance frequency is results in a higher power transfer level and changing it to be further from the resonance frequency reduces the power level.

In some embodiments, the adaptation may be performed by adapting the phase of the drive signal. For example, phase shift modulation can be applied to a full bridge inverter.

In many embodiments, the setpoint may be indicative of the target power level of the power transfer signal. Alternatively or additionally, the setpoint may directly indicate possible other parameters that may be indicative of a power property of the power transfer signal, such as for example a target duty cycle for the power transfer signal or a target frequency for the power transfer signal. Indeed, in some embodiments, the setpoint may directly indicate a parameter or property of the drive signal, such as a target current level or a target voltage level for the drive signal.

The operation of the wireless power transfer system is based on communication between the power transmitter and the power receiver and in particular the power control loop is based on frequent transmissions of messages (power control error messages) from the power receiver to the power transmitter. The reliability and efficiency of the communication between the power transmitter and the power receiver is of high importance and has a high impact on the overall performance on the wireless power transfer. In many practical systems, advantageous performance is achieved by using communication based on the NFC specifications as previously mentioned.

The system thus in many embodiments uses NFC as medium to communicate between the wireless power transmitter and power receiver. An advantage of NFC is that due to the very short range nature of the communication channel it provides a one to one physical relation between the power and communication coils such that the risk of communication between the power transmitter and a power receiver that is not the one being powered by the power transmitter is very small. Additionally, the NFC carrier can be harvested and used to supply power to the wireless receiver communication electronics without starting the power transmitter.

However, an issue for communication in a wireless power transfer system, including one using NFC, is that the communication may be susceptible to interference from the power signal. Whereas the communication carrier may have a very different frequency than the operating frequency of the drive signal and power transfer signal (e.g. 13.56 MHz relative to 20-80 kHz), the power level of the power transfer signal in systems such as Ki may be very high and is typically several orders of magnitude higher than the power of the communication carrier. Accordingly, substantial cross-interference may occur which may impact communication performance and consequently performance of the power transfer as a whole.

In many systems, such as specifically in Ki, this problem has been addressed by separating the power transfer and the (NFC) communication in time, and specifically a time division approach may be used where a repeating time frame is divided into at least one power transfer time interval and one communication time interval. In such cases, power transfer may only be performed outside the communication time interval and thus interference from the power transfer to the communication may be avoided.

In the example of FIGS. 1 and 2, the driver 201 is arranged to generate the drive signal to separate communication and power transfer into disjoint communication time intervals and specifically into communication time intervals and power transfer time intervals. In the following examples of embodiments will be described where the driver 201 employs a repeating time frame for the drive signal and the power transfer signal during the power transfer phase when in the first mode of operation, and optionally also when in the second mode of operation.

Figure 8:
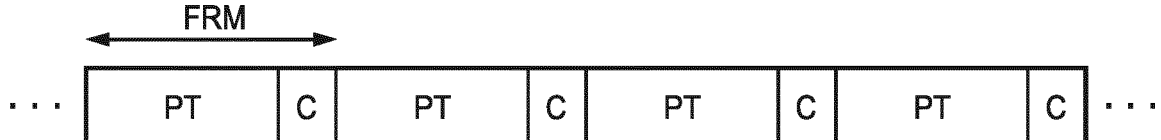
FIG. 8 illustrates an example of a repeating time frame for a power transfer signal.

The repeating time frame comprises at least one power transfer time interval and one communication time interval. An example of such a repeating time frame is illustrated in FIG. 8 where power transfer time intervals are indicated by PT and the communication time intervals are indicated by C. In the example, each time frame FRM comprises only one communication time interval C and one power transfer time interval PT and these (as well as the time frame itself) have substantially the same duration in each frame. However, it will be appreciated that in other embodiments, other time intervals may also be included in a repeating time frame (such as e.g. foreign object detection intervals) or a plurality of communication time intervals and/or power transfer time intervals may be included in each time frame. Furthermore, the duration of the different time intervals (and indeed the time frame itself) may in some embodiments vary dynamically as will be described later.

In the example, power transfer is performed in the power transfer time intervals. The driver is arranged to generate the drive signal and thus the power transfer signal during the power transfer time intervals and specifically a drive signal having a non-zero amplitude/power is generated during the power transfer time intervals. However, during the communication time intervals a reduced power level is used, and specifically in many embodiments no power transfer signal is generated. Typically, this is achieved by the driver 201 generating no drive signal during the communication time intervals (or equivalently the drive signal is controlled to have an amplitude/power of zero or close to zero (e.g. specifically the drive signal is generated with an amplitude that is less than an amplitude threshold of 0, 1, 2, 3 or 5, or 10V and/or the drive signal is generated with a power that is less than a power threshold of less than 1, 2, 3, 5, 10 W or e.g. 1, 2, 3, 5, or 10% of a maximum power for the power transfer)).

Separating the communication and power transfer in time, and specifically using a repeating time frame, can result in substantially reduced (and possibly no) cross-interference from the power transfer to the communication operation. Thus, the interference caused to the communication from the power transfer signal may be substantially reduced and may indeed be reduced to substantially zero. This may vary substantially improve communication performance and reliability thereby leading to improved and more reliable power transfer operation.

In the power transfer phase, the power transmitter is thus arranged to perform power transfer during the power transfer time interval of the time frames. Specifically, during these time intervals and when operating in the first mode, the power transmitter 101 and the power receiver 105 may operate a power control loop. The power control loop may be based on communication within the power transfer time interval or may e.g. be based on communication outside of the power transfer time interval, such as in dedicated communication time intervals. Thus, the level of the power being transferred may be dynamically varied. In the communication time intervals, the power transfer signal may effectively be switched off, but power control error messages for controlling the power loop operations during the power transfer time intervals may be communicated.

However, whereas such time separation between communication and power transfer may provide a number of substantial advantages it may also have some associated disadvantages. For example, the repeated interruption may in many situations result in audible noise (e.g. caused by the mechanical effects of surrounding object in response to the variations in the generated magnetic field). Also, the switching on and off of the drive signal and power transfer signal may result in amplitude harmonics that may generate electrical and electromagnetic noise. For example, interrupting the power signal may generate electromagnetic interference (e.g. 50 Hz harmonics) on to the mains supply. The larger the interruption in power due to the communication time interval, the larger a filter is needed in order to sufficiently suppress noise. A larger communication time interval may also result in that the switching on/off of the power occurs for higher power levels which may result in increased mains related noise and potentially more electromagnetic interference being generated.

Further, the lack of a power transfer signal during the communication time intervals requires the power to be provided during a shorter time resulting in a higher power level being required during the power transfer time intervals. Further, as the power transfer may be intermittent, it is for many applications necessary for the power receiver to comprise some form of energy reservoir (e.g., a capacitor) to maintain power supply during the communication time intervals. In many approaches, a requirement to switch off power transfer in order to communicate may result in the communication being restricted to short data messages in order to minimize the duration of the power transfer disruptions. The disadvantages tend to be of increasing significance for increasing power transfer levels and tend to be very significant for applications such as Ki that may be used to transfer very high power levels.

The power transmitter of FIG. 2 comprises a timing circuit 215 which is arranged to control timing of the communication time intervals The selection circuit 213 may change a timing property for the communication time intervals depending on whether the power transmitter is operating in the first mode of operation or in the second mode of operation.

In particular, the timing circuit 215 may be arranged to allocate a (typically substantially) higher proportion of time to communication time intervals when in the first mode of operation than when in the second mode of operation. The system may thus dynamically adapt the communication function to differentiate between the different modes of operation. The power transmitter of FIG. 2 may provide improved performance by adapting the communication performance and specifically the time division into (at least) power transfer time intervals and communication time intervals such that they more closely suit different communication preferences for the different operational modes. This may for example allow improved power transfer, lower complexity operation, reduced electromagnetic interference, and improved electromagnetic compatibility.

Indeed, in some embodiments, a power receiver may even be arranged to select between the different operational modes based on the acceptable electromagnetic interference. For example, a power receiver may select to operate in the first mode of operation and then switch to the second mode of operation if this results in too excessive electromagnetic interference. As a specific example, the approach may allow a power receiving device to use full power control for lower power levels where the electromagnetic interference is relatively low. However, electromagnetic interference may increase for increasing power transfer levels and the power receiving device may accordingly switch to the second mode of operation for higher power levels thereby reducing the electromagnetic interference for the given power level.

The power transfer system may be arranged to provide less communication capacity when in the second mode of operation than when in the first mode of operation. The reduced communication capacity in the second mode of operation can be made feasible by the second mode of operation being implemented with reduced communication between the power receiver and the power transmitter when in the second mode than when in the first mode. In particular, the second mode of operation does not require frequent power control error messages to support a dynamic power control loop and indeed in many embodiments may be implemented without any power feedback except for an initial power transfer signal setpoint. Thus, the system may e.g. provide a dynamic and flexible adaptation of trade-offs between e.g. power transfer efficiency, flexibility, accuracy, electromagnetic interference etc on one side, and complexity and electromagnetic compatibility on the other side.

The timing circuit 215 may accordingly be arranged to reduce communication capacity for the second mode of operation and the second mode of operation may be arranged to employ less communication to support the power transfer.

In particular, when in the second mode of operation with e.g. static control being employed, less data and fewer messages need to be sent from the power receiver to the power transmitter and the timing circuit 215 may adapt to employ shorter or fewer communication time intervals.

In many embodiments, the drive signal and power transfer signal are driven to employ a repeating time frame which includes power transfer time intervals (in which power is transferred and the power control loop is typically operated) and reduced power time intervals (in which power is reduced relative to the power transfer time intervals). These reduced power time intervals may typically be used as communication time intervals during which at least some communication may be performed (with no or reduced interference from the power transfer). In some embodiments, the reduced power time intervals may also be used for foreign object detection, and indeed in some embodiments, reduced power time intervals may be used to perform simultaneous communication and foreign object detection.

In many embodiments, the driver 201 may be supplied by a varying power supply signal, and typically by a varying supply voltage. The drive signal may typically be generated to have an amplitude that follows the varying power supply signal and specifically that follows the varying supply voltage.

Figure 9:
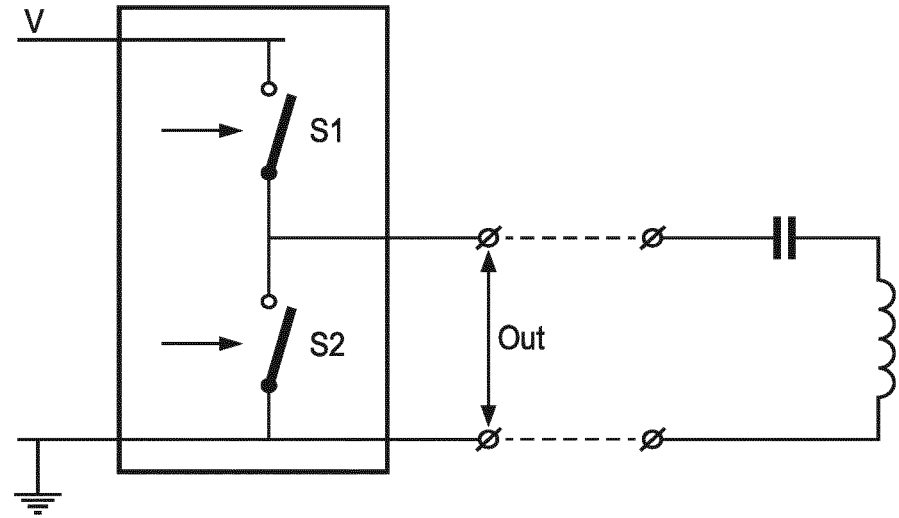
FIG. 9 illustrates an example of a half bridge inverter for a power transmitter.
Figure 10:
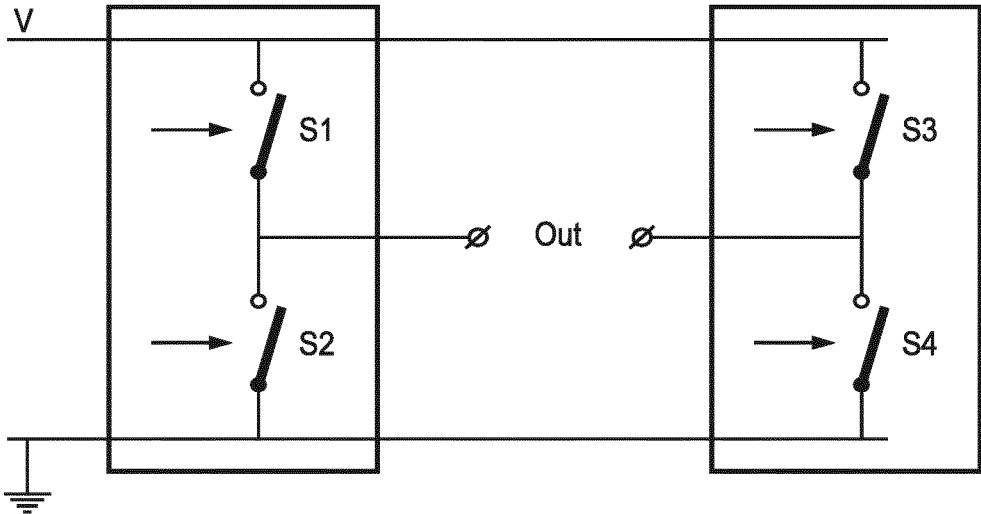
FIG. 10 illustrates an example of a full bridge inverter for a power transmitter.

For example, the output of the driver 201 is typically a switch bridge generating the drive signal by the appropriate switching of switches of the switch bridge. FIG. 9 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 10 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency. In such a driver, the supply voltage may be a varying supply voltage and the drive signal may be generated to have an amplitude equal to the supply voltage except for a small voltage drop over the switch elements.

For example, in many embodiments, the supply voltage for the driver 201 (and specifically for the output inverter such as those of FIGS. 9 and 10) may be generated from a rectified (and possibly partially smoothed) AC mains voltage. For a non-smoothed and rectified voltage, the input supply voltage, and thus the drive signal voltage, will reach a minimum of zero volts at times corresponding to the zero crossings of the mains voltage. For partially smoothed rectified supply voltages, the minimum voltage/power may occur with a delay relative to the zero crossings and may by higher than zero volts.

In such embodiments, the reduced power/foreign object detection/communication time intervals may be synchronized to the minima in the (absolute) supply signal/voltage. The timing circuit 215 may be arranged to synchronize the communication time interval such that the time of the minima of the varying power supply signal falls within the reduced power time intervals, and typically such that the communication time interval are centered around these minima.

In many embodiments, the timing of the reduced power time intervals/communication time intervals are such that they are centered around the time of the minima of the varying power supply signal, and thus typically also around the minima of the power transfer signal. In many embodiments, the timing circuit 215 may be arranged to control the timing of the communication time intervals such that they are substantially centered around the zero levels of the input supply voltage (often zero crossings of the input mains voltage).

Figure 11:
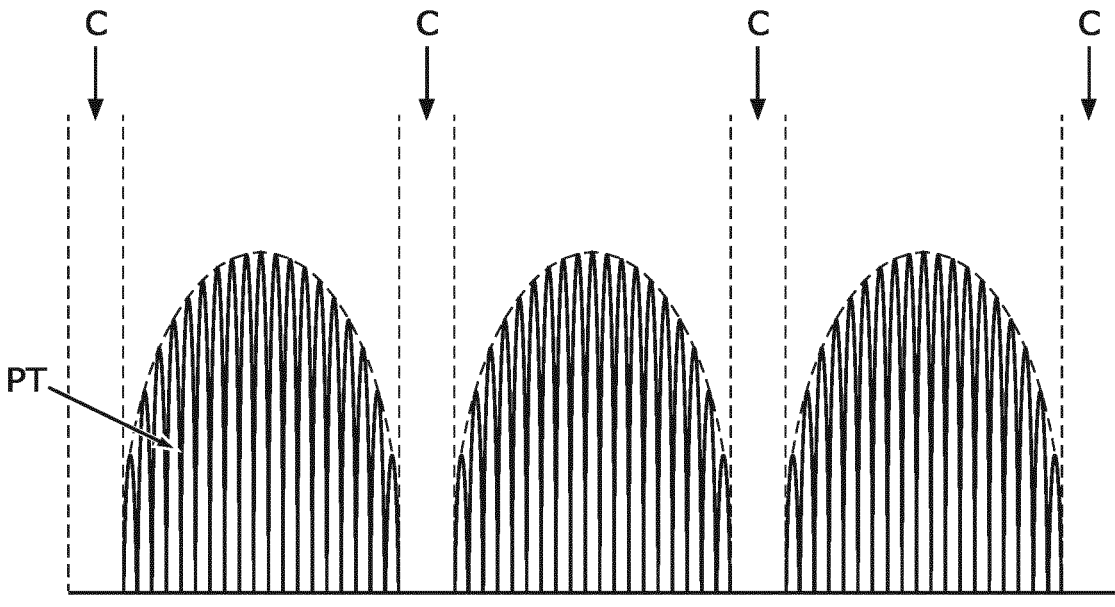
FIG. 11 illustrates an example of a power transfer signal in accordance with some embodiments of the invention.

For example, for the driver 201 being supplied by a rectified mains voltage of 50 Hz, a zero crossing of the mains, and thus a minimum of the rectified supply voltage and power, occurs at 10 msec intervals, and each repeating time frame may be set to have a duration of 10 msec. An example of the resulting drive signal/power transfer signal is illustrated in FIG. 11 which shows the drive signal/power transfer signal during power transfer time intervals PT and communication time intervals C.

In many embodiments, a repeating time frame may be employed in both the first and second mode of operation and further the communication time intervals may be located around the power/amplitude minima for the supply power. Using such a repeating time frame, communication and power transfer can be separated in the time domain thereby resulting in substantially reduced (and possibly no) cross-interference from the power transfer to the communication. Thus, the interference caused to the communication by the power transfer signal may be substantially reduced and may indeed be reduced to substantially zero. This may substantially improve communication performance and reliability thereby leading to improved and more reliable power transfer operation.

In the power transfer phase, the power transmitter is thus arranged to perform power transfer during the power transfer time interval of the time frames. Specifically, when in the first mode of operation, the power transmitter 101 and the power receiver 105 may operate a power control loop during the power transfer time intervals based on communication performed during the communication time intervals. Thus, the level of the power being transferred may be dynamically varied. In the communication time intervals, the power transfer signal may effectively be switched off, but power control error messages for controlling the power loop operations during the power transfer time intervals may be communicated.

However, whereas such time separation between communication and power transfer may provide a number of substantial advantages it may also have some associated disadvantages. For example, as previously mentioned, the repeated interruption may in many situations result in audible noise, and the switching on and off of the drive signal and power transfer signal may result in amplitude harmonics that may generate both electrical and electromagnetic noise and interference and electromagnetic noise (50 Hz harmonics).

Further, the lack of a power transfer signal during the communication time intervals requires the power to be provided during a shorter time resulting in a higher power level being required during the power transfer time intervals. Further, as the power transfer may be intermittent, it is for many applications necessary for the power receiver to comprise some form of energy reservoir. Shorter communication time interval may also constrain communication substantially and the this may affect power transfer performance.

Figure 12:
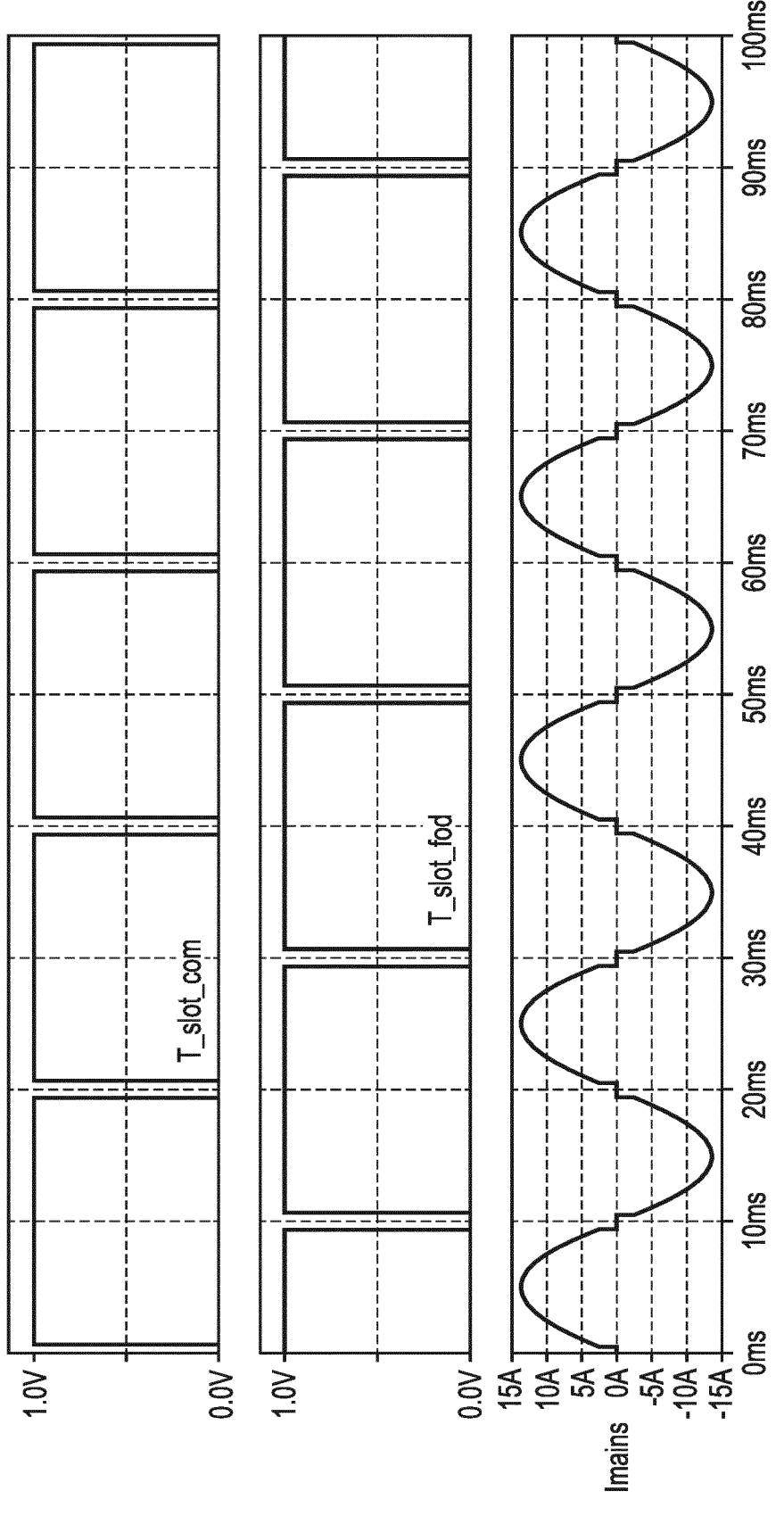
FIG. 12 illustrates an example of communication time intervals, foreign object detection time interval, and a drive signal for a power transmitter in accordance with some embodiments of the invention.

FIG. 12 illustrates an example where a repeating time frame may be used which includes an alternating communication time interval (T_slot_com) and foreign object detection time interval (T_slot_fod) separated by power transfer signals. The repeating time frame has a duration equal to a time period of the supply power and the communication time interval and foreign object detection time interval are located around the zero crossings/minima of the supply power. FIG. 12 further shows an example of the drive signal current (Imains) for an example where the time slot duration of the communication time intervals and foreign object detection time intervals of 1.2 msec and for a 2.2 kW power transfer.

Figure 13:
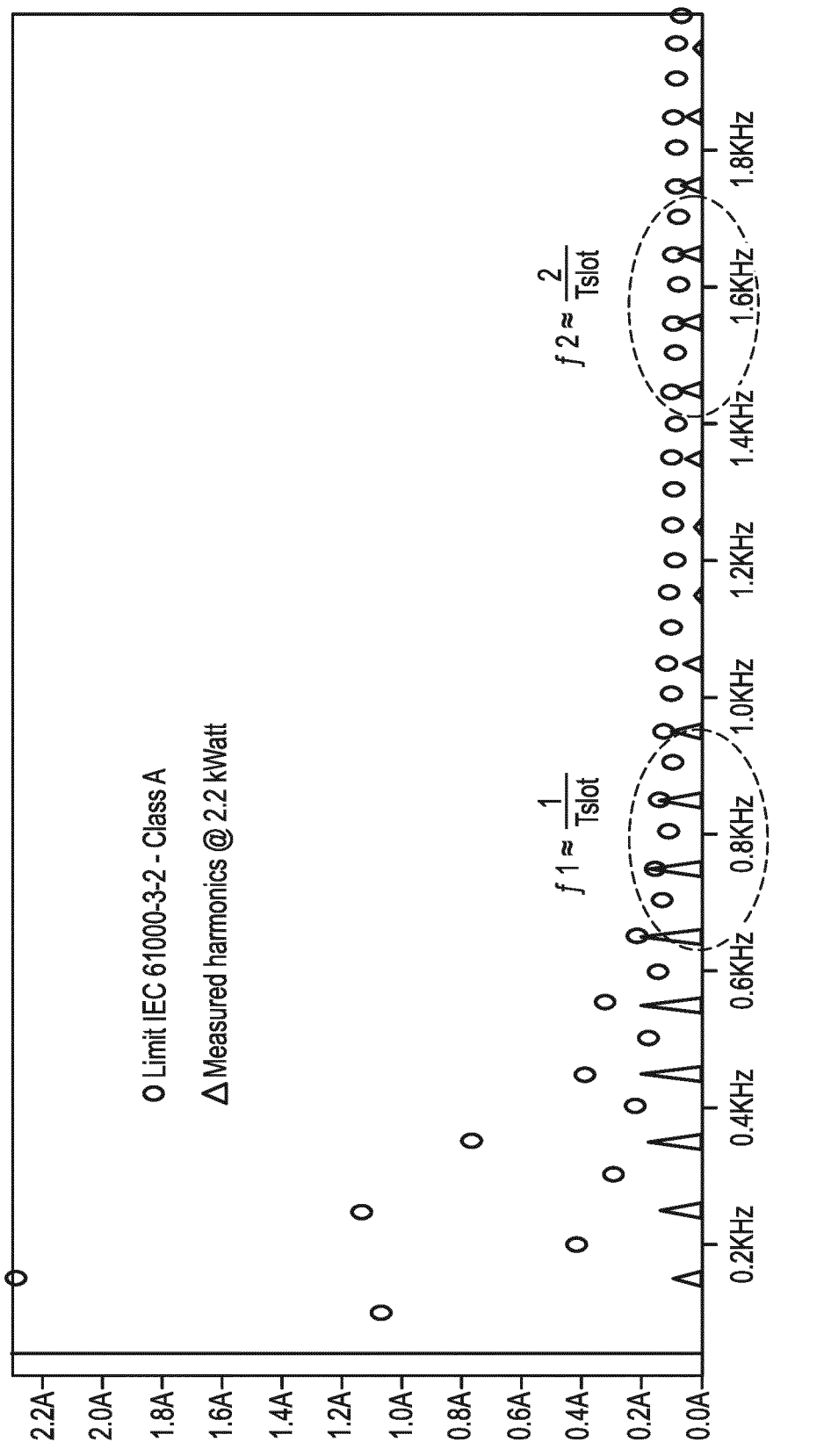
FIG. 13 illustrates an example of electromagnetic interference and interference requirements for a power transmitter in accordance with some embodiments of the invention.

FIG. 13 illustrates the resulting harmonics that may arise compared to acceptable limits in accordance with IEC 61000-3-2: Limits for harmonic current emissions. As illustrated, the current drawn and the presence of the low power time intervals result in harmonics that are close to the IEC 61000-3-2 limit. It would be preferred to have lower amplitudes of these harmonics.

Figure 14:
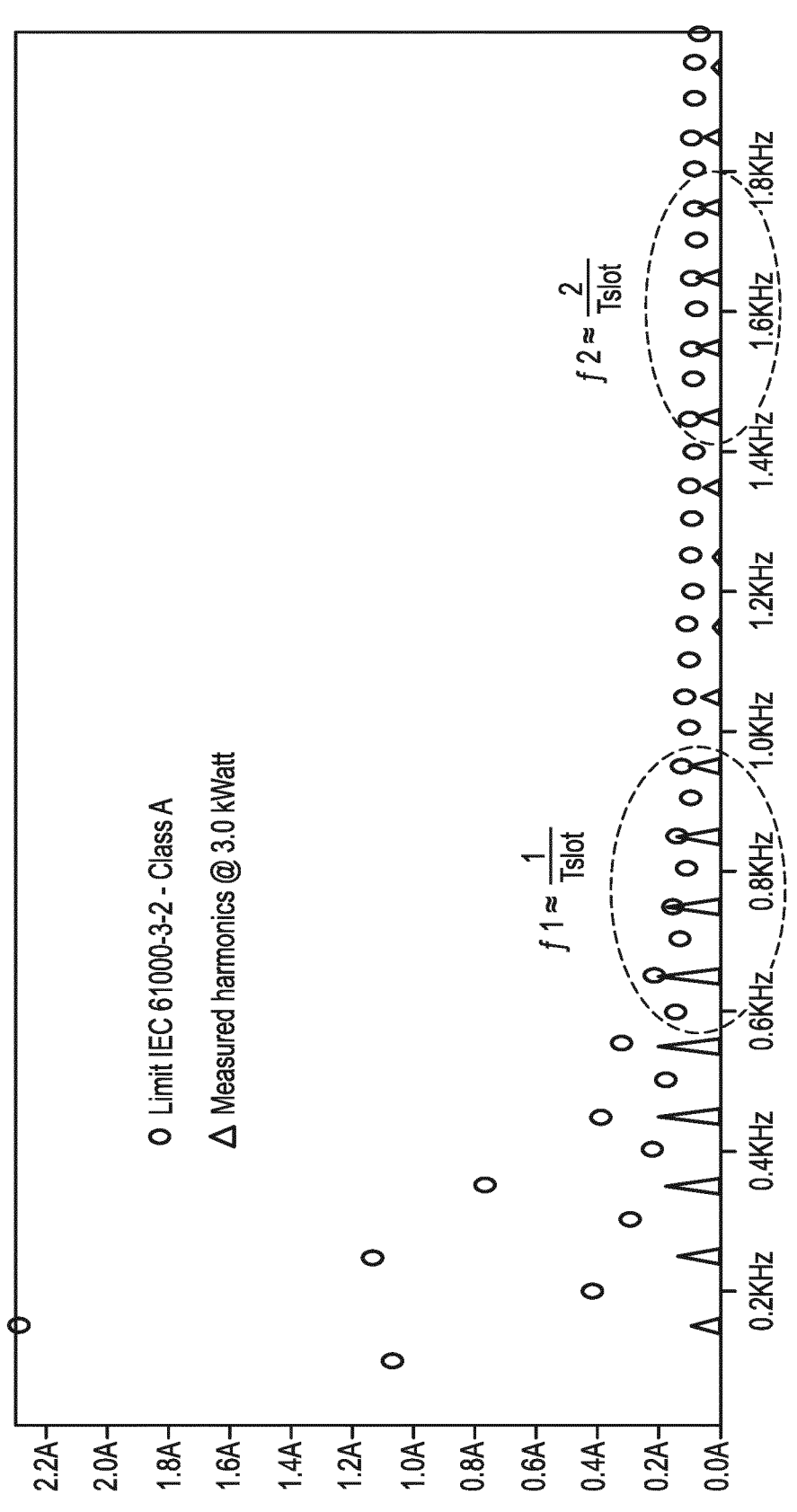
FIG. 14 illustrates an example of electromagnetic interference and interference requirements for a power transmitter in accordance with some embodiments of the invention.

Further, the magnitude of the harmonics depends on the power level and increasing the power level will result in the limits no longer being met. For example, FIG. 14 shows a corresponding example with the power level increased to 3 kW.

Figure 15:
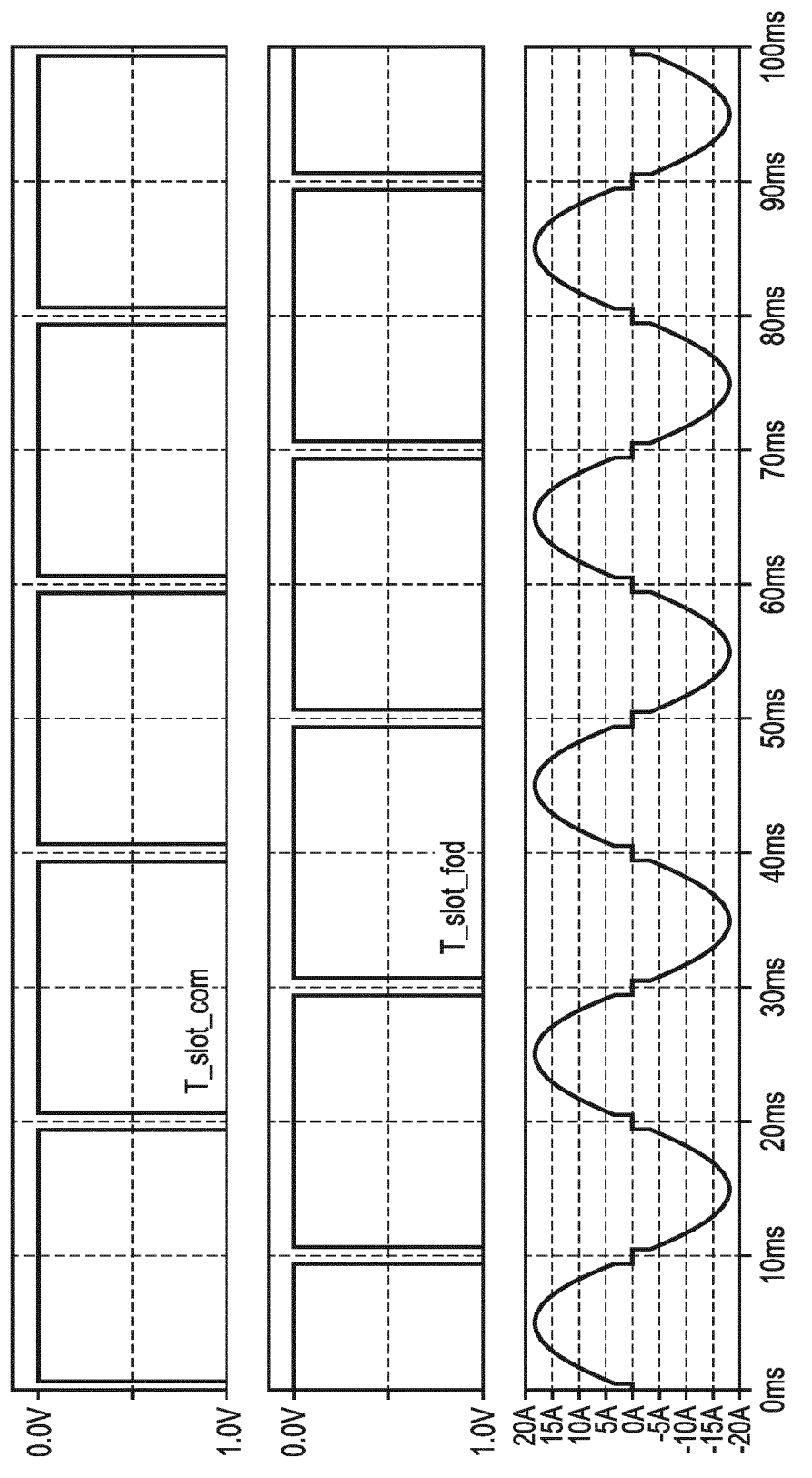
FIG. 15 illustrates an example of communication time intervals, foreign object detection time interval, and a drive signal for a power transmitter in accordance with some embodiments of the invention.
Figure 16:
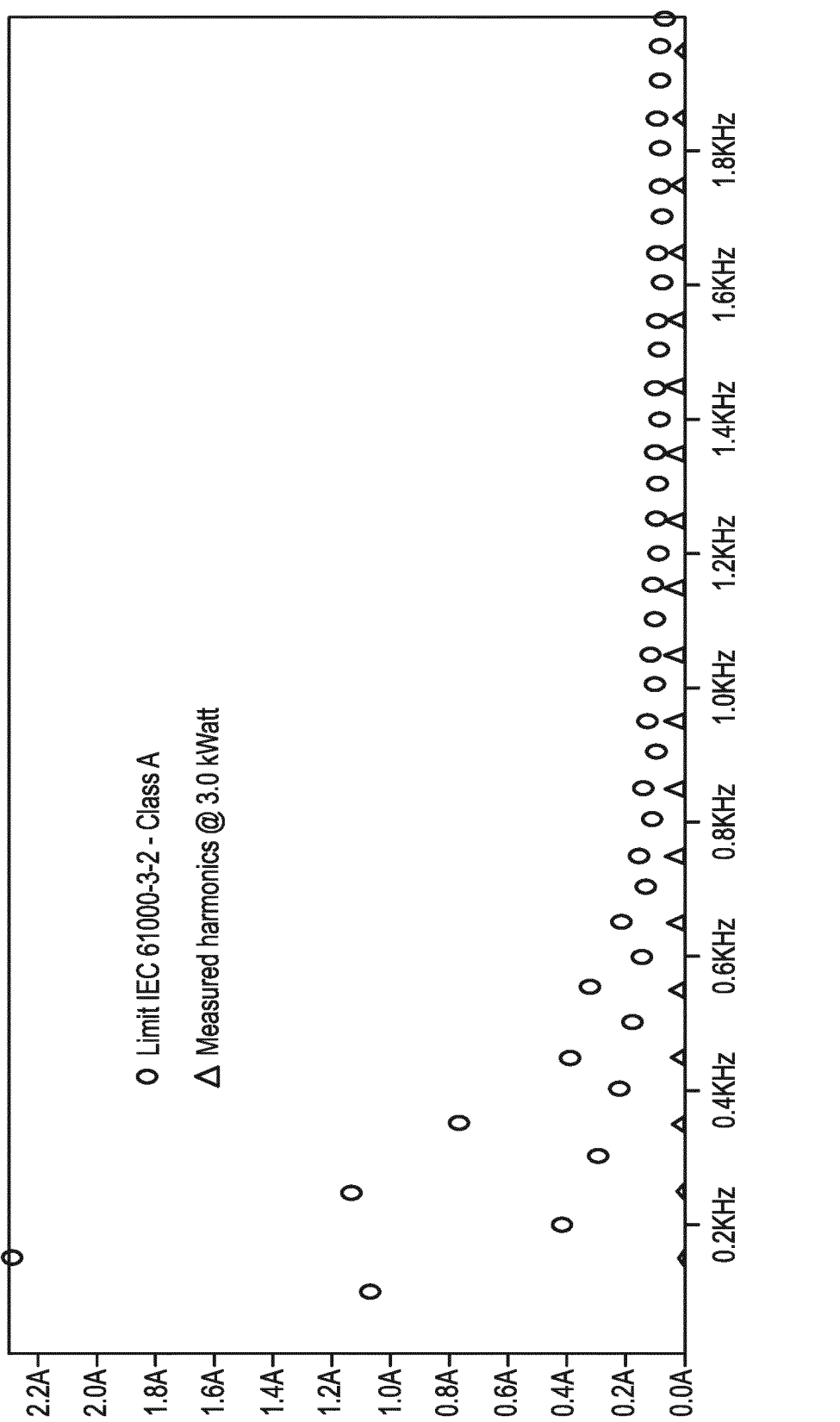
FIG. 16 illustrates an example of electromagnetic interference and interference requirements for a power transmitter in accordance with some embodiments of the invention.

In some embodiments, the timing circuit 215 may be arranged to reduce the duration of the communication time intervals (and often also other reduced power time intervals such as any foreign object detection time intervals) when in the second mode of operation relative to when in the first mode of operation. For example, FIG. 15 illustrates an example corresponding to FIG. 12 but with the power transmitter being in the second mode of operation and the reduced power time intervals accordingly being reduced, in the example to 0.6 msec. FIG. 16 illustrates the corresponding harmonics response for a 3 kW power transfer corresponding to FIG. 14. In comparison, it can be seen that the level of the harmonics is substantially reduced and indeed the reduction in the time slot duration results in the harmonics meeting the IEC limit.

In some embodiments, a power receiver may accordingly be arranged to operate in the first mode of operation for lower power levels. However, if the power receiver determines that power transfer above a given level is required, it may transmit a request to the power transmitter to switch to the second mode of operation, and it may transmit a power transfer signal setpoint that indicates the desired power transfer level. The power transmitter may then switch to the second mode of operation, set the power level to the requested amount, and reduce the duration of the communication time intervals, e.g. in the specific example from 1.2 msec to 0.6 msec. Such an approach may for example allow increased power transfer while ensuring that electromagnetic interference is kept below a required level.

In some embodiments, the timing circuit 215 is accordingly arranged to set a duration of the communication time intervals to be higher when in the first mode of operation than when in the second mode of operation. The shorter duration when in the second mode may reduce the harmonics and electromagnetic interference etc. but may not allow frequent transmissions of power control error messages. In contrast, when in the first mode of operation, the longer duration of the communication time intervals may allow for more information and longer messages and this may be used to support the power control loop and it may specifically set to be sufficient to allow frequent communication of power control error messages.

In some embodiments, the timing circuit 215 may be arranged to vary a frequency of the communication time intervals between the different modes of operation. The timing circuit 215 may vary/adapt the duration between communication time intervals depending on whether the power transmitter is operating in the first or second mode of operations. Thus, in many embodiments, the timing circuit 215 is arranged to set a frequency of the communication time intervals to be higher when in the first mode of operation than when in the second mode of operation.

As an example, the timing circuit 215 may be arranged to maintain the duration of each communication time interval at a constant duration. For example, the duration of a communication time interval may be arranged to be sufficiently large to allow a full message to be transmitted from the power receiver to the power transmitter (or vice versa). If messages can have different lengths, the duration of the communication time interval may for example be set to the lowest value that will ensure that the longest possible message can be transmitted. As a specific example, the duration of the communication time intervals may be set to be fixed at, say, 1.2 msec for both the first and the second mode of operation.

However, the duration between the communication time intervals, and thus the frequency of the communication time intervals, may be set to be (potentially very) different in the two modes. For example, in the first mode of operation, communication time intervals may be synchronized with variations in the supply power and a communication time interval may be include every time the supply power reaches a power minimum, typically corresponding to a zero crossing of a mains power supply. For a mains frequency of 50 Hz, the frequency of the communication time intervals may be 100 Hz corresponding to a new communication time interval occurring with 10 msec intervals.

In contrast, when the power transmitter is in the second mode of operation, the communication time intervals may occur at much lower frequency. For example, a communication time interval may only be generated e.g. every second or every 10 seconds. Thus, whereas a full message may still be transmitted in each communication time interval, a much lower rate of data messages is implemented. In this scenario, it may not be possible to support quick adaptation of the power transfer and e.g. a fast reacting power control loop. However, the second mode of operation is specifically one wherein a static operation is used, so the need for such fast operation and adaption is not necessary.

In many embodiments, the timing circuit 215 may be arranged to set a duty cycle of the communication time intervals to be higher when in the first mode of operation than when in the second mode of operation. The duty cycle may be the ratio of time in the communication time interval(s) relative to the combined time in the communication time interval(s) and in the power transfer time interval(s). The duty cycle may a ratio between the duration of a communication time interval and the sum of the duration of the communication time interval and a duration of a power transfer time interval (specifically an adjacent power transfer time interval).

Thus, when in the first mode of operation, the timing circuit 215 may increase the relative time spent in a communication time interval compared to time spent in a power transfer time interval. This increase in duty cycle may be achieved by increasing a duration and/or frequency of communication time intervals when in the first mode of operation compared to when in the second mode of operation.

As previously mentioned, in many embodiments, the power transmitter may employ a repeating time frame for the drive signal and the power transfer signal. The repeating time frame may in some embodiments be employed during the first mode of operation but not during the second mode of operation. For example, when in the first mode of operation, a time frame may be repeated e.g. every 10 or 20 msec for a 50 Hz supply. Each time frame may be divided into a power transfer time interval and a communication time interval and the same division may be used in each time frame. In contrast, during the second mode of operation, the timing circuit 215 may be arranged to generate communication time intervals in an ad-hoc or semirandom basis.

For example, when in the second mode of operation, the timing circuit 215 may randomly vary the duration between communication time intervals (typically subject to an upper and/or lower limit on the duration). When the timing circuit 215 determines that a new communication time interval is starting, it may switch off the power transfer signal and generate a communication carrier. The power receiver may detect that power is switched off and/or that a communication carrier is present, and it may in response proceed to transmit any pending messages to the power transmitter, e.g. by load modulating the carrier.

Such an ad-hoc and/or (pseudo)random variation of the duration between communication time intervals may for example have the advantage of spreading the electromagnetic interference in frequency. Specifically, instead of concentrating the electromagnetic interference in harmonics of a frequency of the communication time interval, the variation may more equally spread the electromagnetic interference energy in frequency to result in lower noise density.

In some embodiments, a repeating time frame may also be employed when the power transmitter is in the second mode of operation. However, the repeating time frame may be modified when in the second mode of operation compared to when in the first mode of operation.

In many embodiments, the timing circuit 215 may be arranged to change the proportion of a repeating time frame which is allocated to the communication time intervals between the different embodiments and specifically may be arranged to reduce the proportion when in the second mode of operation.

Specifically, for a repeating time frame that has the same time period in the first and second mode of operation, the duration of the communication time interval may be reduced. As a specific example corresponding to previously provided examples, the timing circuit 215 may reduce the duration of communication time intervals from 1.2 msec to 0.6 msec when switching from the first mode of operation to the second mode of operation while retaining a fixed duration of the repeating time frames as 10 msec (as e.g. in the examples of FIGS. 12 and 15 respectively).

Figure 17:
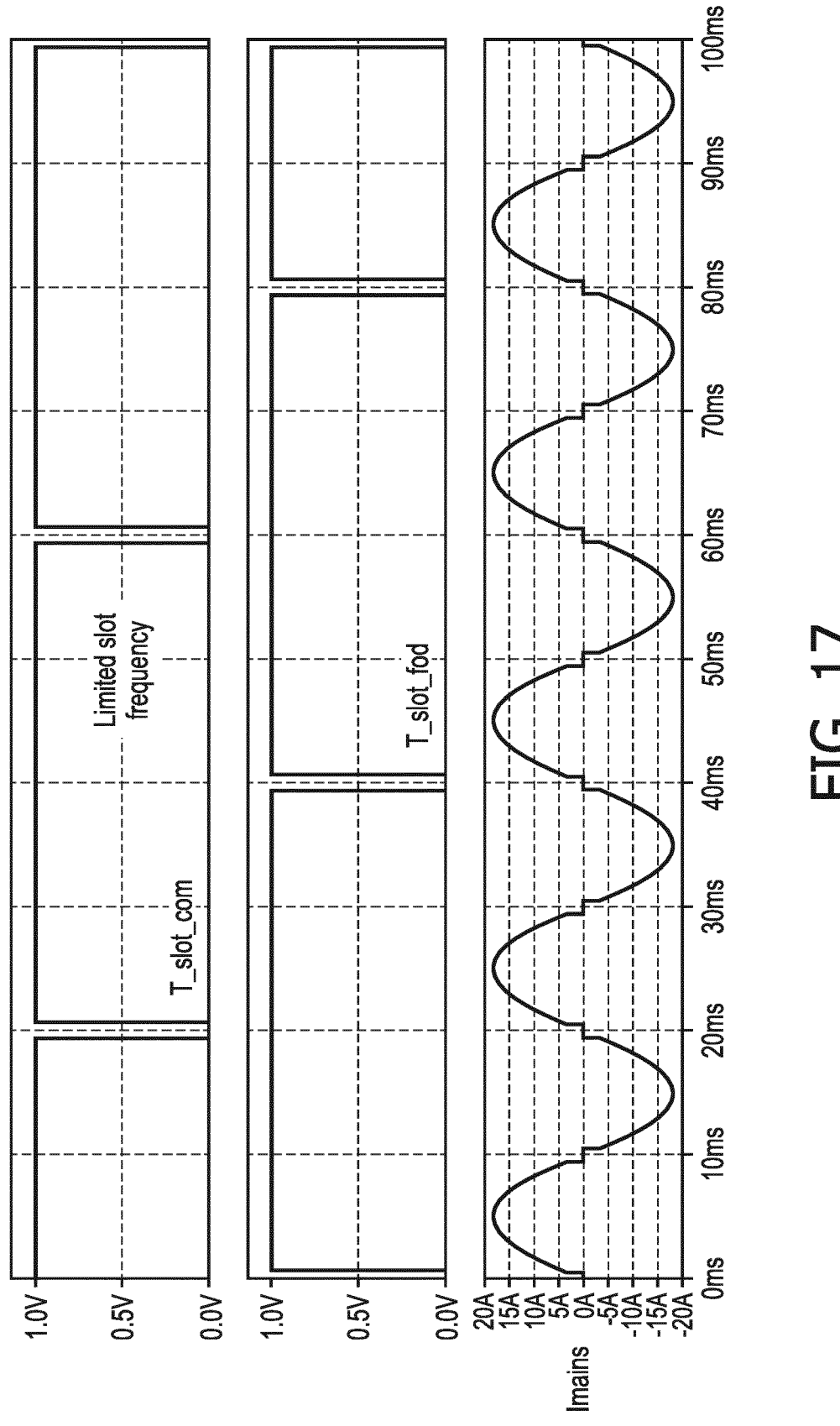
FIG. 17 illustrates an example of communication time intervals, foreign object detection time interval, and a drive signal for a power transmitter in accordance with some embodiments of the invention.
Figure 18:
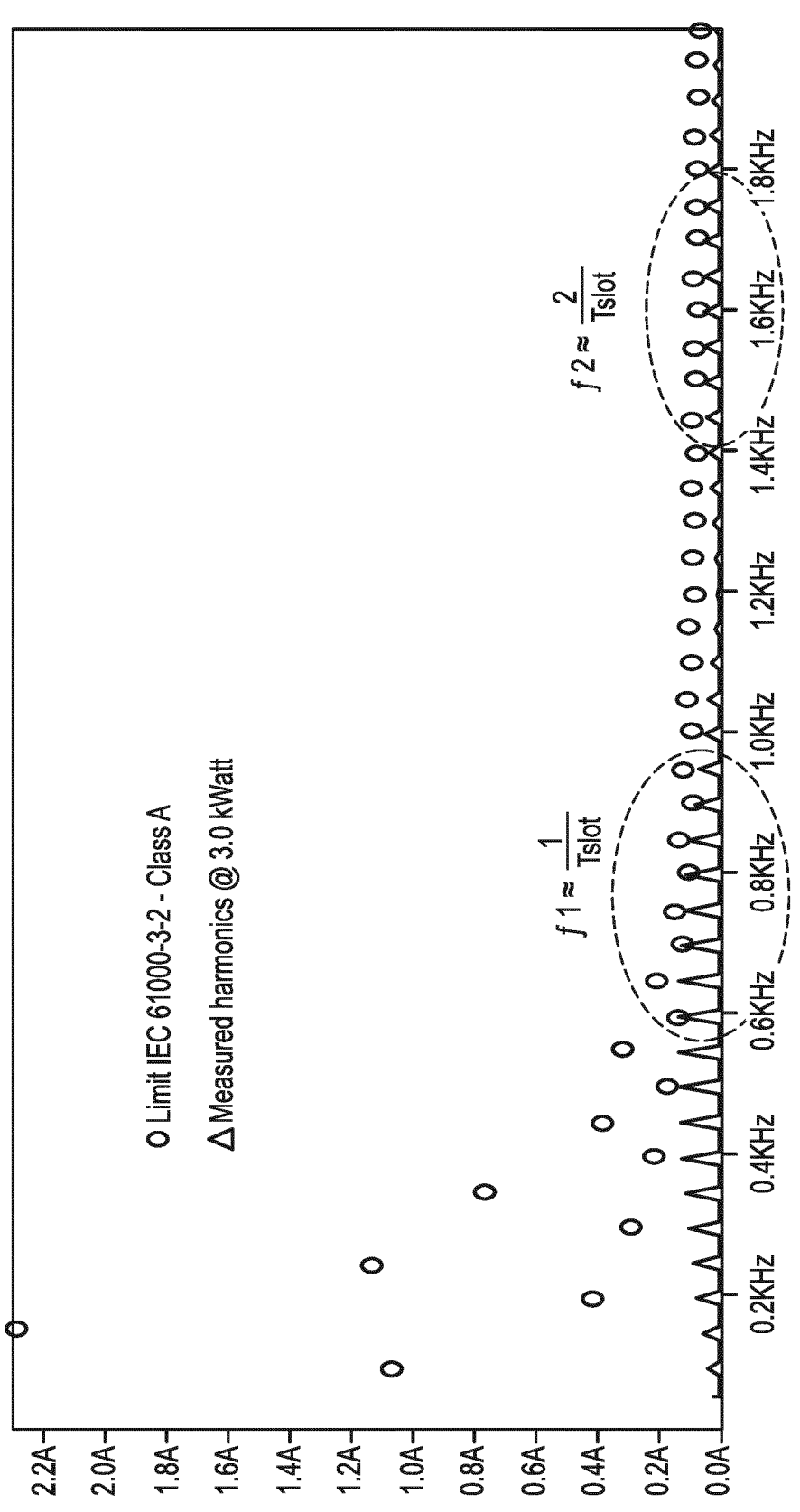
FIG. 18 illustrates an example of electromagnetic interference and interference requirements for a power transmitter in accordance with some embodiments of the invention.

In some embodiments, the timing circuit 215 may be arranged to change the frequency of the communication time intervals in the repeating time frame depending on the mode of operation. For example, in some embodiments, the timing circuit 215 may be arranged to increase the duration between communication time intervals when switching to the second mode of operation. This may for example be achieved by changing the duration/repetition frequency of the repeating time frame. For example, the timing circuit 215 may impose the pattern of FIG. 12 when in the first mode of operation and then switch to the pattern of FIG. 17 when in the second mode of operation. In the example of FIG. 17, the duration of communication time intervals (and foreign object detection time intervals) is kept at 1.2 msec but only half of the supply power minima are associated with reduced power time intervals. Thus, the example of FIG. 17 can be considered to correspond to the example of FIG. 12 but with the duration of a repeating time frame being doubled. This may result in a reduced interference and may specifically result in harmonics occurring with half the frequency but at reduced levels as shown in FIG. 18.

In some embodiments, the timing circuit 215 may be arranged to adapt whether communication time intervals are included in the repeating time frame to follow a different pattern when in the first mode of operation and when in the second mode of operation. Specifically, when in the first mode of operation, the timing circuit 215 may control the power transmitter to generate a communication time interval in all repeating time frames. However, when switching to the second mode of operation, the timing circuit 215 may proceed to generate communication time intervals in only some repeating time frames.

For example, the power transmitter may when in the second mode of operation continue to employ a repeating time frame having the same duration but may only include a communication time interval in only every other the time frame (corresponding to the frequency of communication time intervals being reduced by a factor of two when switching from the first mode of operation to the second mode of operation). In other cases, the timing circuit 215 may be arranged to only include communication time intervals in every third, fourth etc. repeating time frame. In some embodiments, the pattern of repeating time frames including a communication time interval may be non-periodic and may e.g. be in accordance with a predetermined pattern. In yet other embodiments, the repeating time frames in which a communication time interval is included may be pseudo-random.

It will be appreciated that different approaches may be used in different embodiments depending on the specific preferences and requirements of the embodiment. It will also be appreciated that different approaches may be combined, e.g. the timing circuit 215 may be arranged to change both the communication time interval duration and frequency between the two different operational modes.

The described approaches may adapt the communication, and specifically a timing property of communication time intervals, to the different operations in the two different modes. Specifically, the communication resource made available to the communication between the power transmitter and power receiver may be adapted to reflect that these may differ (often substantially) between the two modes. This may specifically be used to reduce electromagnetic interference and increase electromagnetic compatibility. Specifically, interference from harmonics of the communication time intervals may in many embodiments be reduced very substantially.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

Generally, examples of an wireless power transfer apparatuses and method are indicated by below embodiments.

EMBODIMENTS

Embodiment 1. A power transmitter (101) for wirelessly providing power to a power receiver (105) via an inductive power transfer signal; the power transmitter (101) comprising:
  a transmitter coil (103) arranged to generate the power transfer signal;
  a driver (201) arranged to generate a drive signal for the transmitter coil (103) to generate the power transfer signal;
  a receiver (207) for receiving messages from the power receiver (105);
  a first controller (209) arranged to control a parameter of the drive signal in accordance with a first mode of operation, the first mode of operation comprising operating a power control loop to control a power property of the power transfer signal in response to power control error messages received from the power receiver (105);
  a second controller (211) arranged to control the parameter of the drive signal in accordance with a second mode of operation, the second mode of operation comprising setting the parameter of the drive signal in response to at least one power transfer signal setpoint received from the power receiver (105), the power transfer signal setpoint being indicative of a target power property for the power transfer signal; and a circuit (213) arranged to select between the first mode of operation and the second mode of operation in response to a power transfer control mode request received from the power receiver (105).

Embodiment 2. The power transmitter of any previous embodiment wherein the power control error messages are indicative of a requested relative change in the power property of the power transfer signal and the setpoint messages are indicative of a requested absolute value of the target power property.

Embodiment 3. The power transmitter of any previous embodiment wherein durations between power control error messages are no more than 300 msec and a maximum duration between power transfer signal setpoints is no less than 10 sec.

Embodiment 4. The power transmitter of any previous embodiment wherein a time constant for the power control loop and a time constant for changing the parameter of the drive signal in response to the at least one power transfer signal setpoint differs by a factor of at least two.

Embodiment 5. The power transmitter of any previous embodiment wherein the second controller (211) implements a drive signal control loop comprising:
  an estimator for generating a power level indication for the power transfer signal;
  a comparator for generating an error signal in response to a comparison between the power level indication and a reference power determined from the at least one power transfer signal setpoint; and
  an adaptor for adapting the parameter of the drive signal in response to the error signal.

Embodiment 6. The power transmitter of any previous embodiment wherein, when in the second mode of operation, the parameter of the drive signal is only changed in response to receiving a power transfer signal setpoint of the at least one power transfer signal setpoint.

Embodiment 7. The power transmitter of any previous embodiment wherein the at least one power transfer signal setpoint is indicative of a target power level for the power transfer signal.

Embodiment 8. The power transmitter of any previous embodiment wherein the at least one power transfer signal setpoint is linked to a validity time interval and the second controller (211) is arranged to set the parameter of the drive signal to a nominal value at the end of the validity time interval.

Embodiment 9. A wireless power transfer system comprising the power transmitter (101) of any previous embodiment and the power receiver (105), the power receiver (105) comprising:
  a coil (107) for extracting power from the power transfer signal,
  a power circuit (301, 305) for providing power extracted from the power transfer signal to a load (303);
  a transmitter (307) for transmitting the at least one power transfer signal setpoint to the power transmitter.

Embodiment 10. The wireless power transfer system of embodiment 9 wherein the power receiver (105) is arranged to transmit the at least one power transfer signal setpoint as indicative of a predetermined target power property for the power transfer signal.

Embodiment 11. The wireless power transfer system of embodiment 9 or 10 wherein the power receiver (105) is arranged to transmit the at least one power transfer signal setpoint as indicative of a target power property for the power transfer signal independently of any measured value for an electrical signal provided to the load (303).

Embodiment 12. The wireless power transfer system of embodiment 9 wherein the power receiver (105) is arranged to transmit the power transfer signal setpoint in response to a measured value for an electrical signal provided to the load (303).

Embodiment 13. The wireless power transfer system of any of the embodiments 9 to 12 wherein the power receiver (105) is arranged to operate in a plurality of load modes and the power receiver (105) is arranged to not transmit a new power transfer signal setpoint to the power transmitter (101) unless switching load mode.

Embodiment 14. A power receiver (105) for wirelessly receiving power from a power receiver (101) via an inductive power transfer signal; the power receiver (105) comprising:

a receiver coil (107) arranged to extract power from the power transfer signal;

a power circuit (301, 305) coupled to the receiver coil (107) and arranged to provide power from the receiver coil to a load (303);

a transmitter (307) for transmitting messages to the power transmitter (101), the transmitter (307) being arranged to transmit a power transfer control mode request to the power transmitter (101), the power transfer control mode request being indicative of a request for the power transmitter to control a parameter of the drive signal in accordance with a first mode of operation or in accordance with a second mode of operation wherein the first mode of operation comprises operating a power control loop to control a power property of the power transfer signal in response to power control error messages received from the power receiver (105); and the second mode of operation comprises setting the parameter of the drive signal in response to at least one power transfer signal setpoint received from the power receiver (105), the power transfer signal setpoint being indicative of a target power property for the power transfer signal.

Embodiment 15. A method of operation for a power transmitter (101) wirelessly providing power to a power receiver (105) via an inductive power transfer signal; the power transmitter (101) comprising:

a transmitter coil (103) arranged to generate the power transfer signal; and the method comprises:

generating a drive signal for the transmitter coil (103) to generate the power transfer signal;

receiving messages from the power receiver (105);

controlling a parameter of the drive signal in accordance with a first mode of operation, the first mode of operation comprising operating a power control loop to control a power property of the power transfer signal in response to power control error messages received from the power receiver (105);

controlling the parameter of the drive signal in accordance with a second mode of operation, the second mode of operation comprising setting the parameter of the drive signal in response to at least one power transfer signal setpoint received from the power receiver (105), the power transfer signal setpoint being indicative of a target power property for the power transfer signal; and selecting between the first mode of operation and the second mode of operation in response to a power transfer control mode request received from the power receiver (105).

Embodiment 16. A method of operation for a power receiver (105) wirelessly receiving power from a power receiver (101) via an inductive power transfer signal; the power receiver (105) comprising:

a receiver coil (107) arranged to extract power from the power transfer signal; and a power circuit (301, 305) coupled to the receiver coil (107) and arranged to provide power from the receiver coil to a load (303);

a transmitter (307) for transmitting messages to the power transmitter (101), and the method comprises the transmitter (307) transmitting a power transfer control mode request to the power transmitter (101), the power transfer control mode request being indicative of a request for the power transmitter to control a parameter of the drive signal in accordance with a first mode of operation or in accordance with a second mode of operation wherein the first mode of operation comprises operating a power control loop to control a power property of the power transfer signal in response to power control error messages received from the power receiver (105); and the second mode of operation comprises setting the parameter of the drive signal in response to at least one power transfer signal setpoint received from the power receiver (105), the power transfer signal setpoint being indicative of a target power property for the power transfer signal.

Embodiment 1. A power transmitter (101) for wirelessly providing power to a power receiver (105) via an inductive power transfer signal; the power transmitter (101) comprising:

a transmitter coil (103) arranged to generate the power transfer signal;

a driver (201) arranged to generate a drive signal for the transmitter coil (103) to generate the power transfer signal, the driver (201) being arranged to generate the drive signal to employ power transfer time intervals during which the power transfer signal is arranged to transfer power to the power receiver (105) and communication time intervals during which a power of the power transfer signal is reduced relative to the power transfer time interval;

a receiver (207) for receiving messages from the power receiver (105) during communication time intervals;

a first controller (209) arranged to control a parameter of the drive signal in accordance with a first mode of operation, the first mode of operation comprising operating a power control loop to control a power property of the power transfer signal in response to power control error messages received from the power receiver (105), a maximum duration between power control error messages being no more than 300 msec;

a second controller (211) arranged to control the parameter of the drive signal in accordance with a second mode of operation, the second mode of operation comprising setting the parameter of the drive signal in response to at least one power transfer signal setpoint received from the power receiver (105), the power transfer signal setpoint being indicative of a target power property for the power transfer signal, a maximum duration between power transfer signal setpoints being no less than a second; and a circuit (213) arranged to select between the first mode of operation and the second mode of operation in response to a power transfer control mode request received from the power receiver (105); and a timing circuit (215) arranged to vary a timing parameter for the communication time intervals between the first mode of operation and the second mode of operation.

Embodiment 2. The power transmitter of embodiment 1 wherein the driver (201) is arranged to employ a repeating time frame to the power transfer signal, each repeating time frame comprising at least one power transfer time interval and at least some repeating time frames comprising at least one communication time interval.

Embodiment 3. The power transmitter of embodiment 2 wherein the timing circuit (215) is arranged to allocate a larger proportion of a repeating time frame to the at least one communication time interval when in the first mode of operation than when in the second mode of operation.

Embodiment 4. The power transmitter of embodiment 2 or 3 wherein the timing circuit (215) is arranged to include a communication time interval in all repeating time frames when in the first mode of operation and to include a communication time interval in only a subset of repeating time frames when in the second mode of operation.

Embodiment 5. The power transmitter of any previous embodiment wherein the timing circuit (215) is arranged to set a duration of the communication time intervals to be higher when in the first mode of operation than when in the second mode of operation.

Embodiment 6. The power transmitter of any previous embodiment wherein the timing circuit (215) is arranged to set a duty cycle of the communication time intervals to be higher when in the first mode of operation than when in the second mode of operation.

Embodiment 7. The power transmitter of any previous embodiment wherein the timing circuit (215) is arranged to set a frequency of the communication time intervals to be higher when in the first mode of operation than when in the second mode of operation.

Embodiment 8. The power transmitter of any of the previous embodiments wherein the driver (201) is arranged to be supplied by a varying power supply signal and the power transmitter is arranged to align a center time of the communication time interval with a signal minimum for the varying power supply signal.

Embodiment 9. The power transmitter of any previous embodiment wherein the power transmitter is arranged to terminate power transfer in response to a detection that no power control error messages have been received for a duration exceeding a first threshold when in the first mode of operation and to not terminate power transfer if no power transfer signal setpoint has been received for a duration exceeding a second threshold when in the second mode of operation, the second threshold being at least twice the first threshold.

Embodiment 10. The power transmitter of any previous embodiment wherein the power control error messages are indicative of a requested relative change in the power property of the power transfer signal and the setpoint messages are indicative of a requested absolute value of the target power property.

Embodiment 11. The power transmitter of any previous embodiment wherein the at least one power transfer signal setpoint is linked to a validity time interval and the second controller (211) is arranged to set the parameter of the drive signal to a nominal value at the end of the validity time interval.

Embodiment 12. A wireless power transfer system comprising the power transmitter (101) of any previous embodiment and the power receiver (105), the power receiver (105) comprising:

a coil (107) for extracting power from the power transfer signal;

a power circuit (301, 305) for providing power extracted from the power transfer signal to a load (303);

a transmitter (307) for transmitting the at least one power transfer signal setpoint to the power transmitter during a communication time interval.

Embodiment 13. The wireless power transfer system of embodiment 12 or 10 wherein the power receiver (105) is arranged to transmit the at least one power transfer signal setpoint as indicative of a target power property for the power transfer signal independently of any measured value for an electrical signal provided to the load (303).

Embodiment 14. The wireless power transfer system of embodiment 12 or 13 wherein the power receiver (105) is arranged to operate in a plurality of load modes and the power receiver (105) is arranged to not transmit a new power transfer signal setpoint to the power transmitter (101) unless switching load mode.

Embodiment 15. A method of operation for a power transmitter (101) wirelessly providing power to a power receiver (105) via an inductive power transfer signal; the power transmitter (101) comprising:

a transmitter coil (103) arranged to generate the power transfer signal; and the method comprises:

generating a drive signal for the transmitter coil (103) to generate the power transfer signal, the drive signal being generated to employ power transfer time intervals during which the power transfer signal is arranged to transfer power to the power receiver (105) and communication time intervals during which a power of the power transfer signal is reduced relative to the power transfer time interval;

receiving messages from the power receiver (105) during communication time intervals;

controlling a parameter of the drive signal in accordance with a first mode of operation, the first mode of operation comprising operating a power control loop to control a power property of the power transfer signal in response to power control error messages received from the power receiver (105), a maximum duration between power control error messages being no more than 300 msec;

controlling the parameter of the drive signal in accordance with a second mode of operation, the second mode of operation comprising setting the parameter of the drive signal in response to at least one power transfer signal setpoint received from the power receiver (105), the power transfer signal setpoint being indicative of a target power property for the power transfer signal, a maximum duration between power transfer signal setpoints being no less than a second;

selecting between the first mode of operation and the second mode of operation in response to a power transfer control mode request received from the power receiver (105); and varying a timing parameter for the communication time intervals between the first mode of operation and the second mode of operation.

The invention claimed is:

1. A power transmitter comprising:

a transmitter coil, wherein the transmitter coil generates a power transfer signal;

a driver circuit, wherein the driver circuit generates a drive signal for the transmitter coil so as to generate the power transfer signal, wherein the driver circuit employs at least one power transfer time interval and at least one communication time interval, wherein the power transfer signal transfers power to a power receiver during the at least one line power transfer interval, wherein a power of the power transfer signal is reduced relative to the power transfer time interval during the at least one communication time interval;

a receiver circuit, wherein the receiver circuit receives messages from the power receiver during the at least one communication time interval;

a first controller circuit, wherein the first controller circuit controls a parameter of the drive signal in accordance with a first mode of operation, wherein the first mode of operation comprises operating a power control loop so as to control a power property of the power transfer signal in response to power control error messages received from the power receiver;

a second controller circuit, wherein the second controller circuit controls the parameter of the drive signal in accordance with a second mode of operation, wherein the second mode of operation comprises setting the parameter of the drive signal in response to at least one power transfer signal setpoint received from the power receiver, wherein the power transfer signal setpoint is indicative of a target power property for the power transfer signal; and a select circuit, wherein the select circuit selects between the first mode of operation and the second mode of operation in response to a power transfer control mode request; and a timing circuit, wherein the timing circuit provides a timing signal to the driver circuit to control timing of the communication time interval based on a set of communication timing parameters, wherein if the power transfer control mode request causes selection of the first mode of operation, then the set of communication timing parameters is set to a first set of timing parameters, and wherein if the power transfer control mode request causes selection of the second mode of operation, then the set of communication timing parameters is set to a second set of timing parameters, wherein the first set of timing parameters differs from the second set of timing parameters.

2. The power transmitter of claim 1, wherein the driver circuit employs at least one repeating time frame, wherein each repeating time frame of the at least one repeating time frame comprises at least one power transfer time interval, wherein a first portion of the at least one repeating time frame comprises the at least one communication time interval.

3. The power transmitter of claim 2, wherein if the power transfer control mode request causes selection of the first mode of operation, the timing circuit allocates a third portion of the at least one repeating time frame to the at least one communication time interval, wherein if the power transfer control mode request causes selection of the second mode of operation the timing circuit allocates a fourth portion of the at least one repeating time frame to the at least one communication time interval, wherein the third portion of the at least one repeating time frame is larger than the fourth portion of the at least one repeating time frame, wherein the first portion of the at least one repeating time frame is either the third portion of the at least one repeating time frame or the fourth portion of the at least one repeating time frame.

4. The power transmitter of claim 2, wherein if the power transfer control mode request causes selection of the first mode of operation, the timing circuit includes the first portion of the at least one communication time interval in all of the at least one repeating time frame wherein if the power transfer control mode request causes selection of the second mode of operation the timing circuit includes the at least one communication time interval in a second portion of at least one repeating time frame.

5. The power transmitter of claim 1, wherein if the power transfer control mode request causes selection of the first mode of operation the timing circuit sets a first duration of the at least one communication time interval, wherein if the power transfer control mode request causes selection of the second mode of operation the timing circuit sets a second duration of the at least one communication time interval, wherein the first duration of the at least one communication time interval is greater than the second duration of the at least one communication time interval.

6. The power transmitter of claim 1, wherein if the power transfer control mode request causes selection of the first mode of operation the timing circuit sets a first duty cycle of the at least one communication time interval, wherein if the power transfer control mode request causes selection of the second mode of operation the timing circuit sets a second duty cycle of the at least one communication time interval, wherein the first duty cycle of the at least one communication time interval is greater than the second duty cycle of the at least one communication time interval.

7. The power transmitter of claim 1, wherein if the power transfer control mode request causes selection of the first mode of operation, the timing circuit sets a first frequency of the at least one communication time interval, wherein if the power transfer control mode request causes selection of the first mode of operation, the timing circuit sets a second frequency of the at least one communication time interval, wherein the first frequency of the at least one communication time interval is higher than the second frequency of the at least one communication time interval.

8. The power transmitter of claim 1, wherein the driver circuit supplies a varying power supply signal, wherein the power transmitter aligns a center time of the at least one communication time interval with a minimum for the varying power supply signal.

9. The power transmitter of claim 1,
wherein if the power transfer control mode request causes selection of the first mode of operation, the power transmitter terminates the power transfer signal in response to a detection that no power control error messages have been received during a first time interval,
wherein the first time interval exceeds a first threshold,
wherein if the power transfer control mode request causes selection of the first mode of operation, the power transmitter maintains the power transfer signal if no power transfer signal setpoint has been received for a second time interval,
wherein the second time interval exceeds a second threshold,
wherein the second threshold is at least twice as large as the first threshold.

10. The power transmitter of claim 1,
wherein the power control error messages indicate a requested change in the power property of the power transfer signal,
wherein setpoint messages indicate an absolute value of the target power property.

11. The power transmitter of claim 1,
wherein the at least one power transfer signal setpoint is linked to a validity time interval,
wherein the second controller circuit sets the parameter of the drive signal to a nominal value at the end of the validity time interval.

12. A method of operating a power transmitter, the method comprising:
generating a power transfer signal;
generating a drive signal,
wherein the drive signal controls the power transfer signal,
wherein the drive signal employs at least one power transfer time interval and at least one communication time interval,
wherein the power transfer signal transfers power to a power receiver during the at least one line power transfer interval,
wherein a power of the power transfer signal is reduced relative to the power transfer time interval during the at least one communication time interval;
receiving messages from the power receiver during the at least one communication time interval;
controlling a parameter of the drive signal in accordance with a first mode of operation,
wherein the first mode of operation comprises operating a power control loop so as to control a power property of the power transfer signal in response to power control error messages received from the power receiver;
controlling the parameter of the drive signal in accordance with a second mode of operation,
wherein the second mode of operation comprises setting the parameter of the drive signal in response to at least one power transfer signal setpoint received from the power receiver,
wherein the power transfer signal setpoint is indicative of a target power property for the power transfer signal;

selecting between the first mode of operation and the second mode of operation in response to a power transfer control mode request;
providing a timing signal to the driver circuit to control timing of the communication time interval based on a set of communication timing parameters,
wherein if the power transfer control mode request causes selection of the first mode of operation, then the set of communication timing parameters is set to a first set of timing parameters, and
wherein if the power transfer control mode request causes selection of the second mode of operation, then the set of communication timing parameters is set to a second set of timing parameters,
wherein the first set of timing parameters differs from the second set of timing parameters.

13. The method of claim 12,
wherein the power circuit employs at least one repeating time frame,
wherein each repeating time frame of the at least one repeating time frame comprises at least one power transfer time interval,
wherein a first portion of the at least one repeating time frame comprises the at least one communication time interval.

14. The method of claim 13, further comprising:
allocating a third portion of the at least one repeating time frame to the at least one communication time interval if the power transfer control mode request causes selection of the first mode of operation,
allocating a fourth portion of the at least one repeating time frame to the at least one communication time interval if the power transfer control mode request causes selection of the second mode of operation,
wherein the third portion of the at least one repeating time frame is larger than the fourth portion the at least one repeating time frame,
wherein the first portion of the at least one repeating time frame is either the third portion of the at least one repeating time frame or the fourth portion the at least one repeating time frame.

15. The method of claim 13, further comprising:
including the first portion of the at least one communication time interval in all of the at least one repeating time frame interval if the power transfer control mode request causes selection of the first mode of operation,
including the at least one communication time interval in a second portion of at least one repeating time frame interval if the power transfer control mode request causes selection of the second mode of operation.

16. The method of claim 12, further comprising:
setting a first duration of the at least one communication time interval interval if the power transfer control mode request causes selection of the first mode of operation,
setting a second duration of the at least one communication time interval interval if the power transfer control mode request causes selection of the second mode of operation,
wherein the first duration is greater than the second duration.

17. The method of claim 12, further comprising:
setting a first duty cycle of the at least one communication time interval interval if the power transfer control mode request causes selection of the first mode of operation, setting a second duty cycle of the at least one communication time interval interval if the power transfer control mode request causes selection of the second mode of operation, wherein the first duty cycle is greater than the second duty cycle.

18. The method of claim 12, further comprising:

setting a first frequency of the at least one communication time interval interval if the power transfer control mode request causes selection of the first mode of operation, setting a second frequency of the at least one communication time interval interval if the power transfer control mode request causes selection of the second mode of operation, wherein the first frequency is higher than the second frequency.

19. The method of claim 12, further comprising varying a power supply signal, wherein the power transmitter aligns a center time of the at least one communication time interval with a minimum for the varying power supply signal.

20. The method of claim 12, further comprising:

terminating the power transfer signal in response to a detection that no power control error messages have been received during a first time interval interval if the power transfer control mode request causes selection of the first mode of operation, wherein the first time interval exceeds a first threshold; and maintaining the power transfer signal if no power transfer signal setpoint has been received for a second time interval interval if the power transfer control mode request causes selection of the second mode of operation, wherein the second time interval exceeds a second threshold, wherein the second threshold is at least twice as large as the first threshold.

21. The method of claim 12, wherein the power control error messages indicate a requested change in the power property of the power transfer signal, wherein setpoint messages indicate an absolute value of the target power property.

22. The method of claim 12, wherein the at least one power transfer signal setpoint is linked to a validity time interval, wherein the second controller circuit sets the parameter of the drive signal to a nominal value at the end of the validity time interval.

23. A non-transitory computer-readable medium comprising a computer program, wherein the computer program, when executed by a processor, performs the method as claimed in claim 12.

* * * * *